United States Patent
Xu et al.

(10) Patent No.: US 9,456,291 B2
(45) Date of Patent: Sep. 27, 2016

(54) SESSION PROCESSING METHOD AND APPARATUS OF MACHINE TYPE COMMUNICATION

(71) Applicant: Huawei Device Co., Ltd., Shenzhen, Guangdong (CN)

(72) Inventors: Guanbin Xu, Beijing (CN); Wanqiang Zhang, Beijing (CN); Weihua Qiao, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 269 days.

(21) Appl. No.: 14/089,275

(22) Filed: Nov. 25, 2013

(65) Prior Publication Data

US 2014/0094139 A1   Apr. 3, 2014

Related U.S. Application Data

(63) Continuation of application No. PCT/CN2012/081459, filed on Sep. 17, 2012.

(51) Int. Cl.
*H04M 11/00* (2006.01)
*H04W 4/00* (2009.01)
(Continued)

(52) U.S. Cl.
CPC .......... *H04W 4/005* (2013.01); *H04L 41/0893* (2013.01); *H04W 8/18* (2013.01); *H04M 15/66* (2013.01)

(58) Field of Classification Search
CPC ..... H04W 4/005; H04W 12/08; H04W 4/24; H04W 4/02; H04W 60/00; H04W 8/046; H04L 67/1006; H04L 67/1014; H04L 65/80
USPC ......... 455/405, 406; 726/2–7, 17–19, 27, 28
See application file for complete search history.

(56) References Cited

U.S. PATENT DOCUMENTS

2010/0057485 A1\* 3/2010 Luft ........................ H04W 4/00 455/411
2012/0060198 A1\* 3/2012 Tremblay ............ H04L 12/1407 726/1

(Continued)

FOREIGN PATENT DOCUMENTS

| CN | 102238512 A | 11/2011 |
| CN | 102238629 A | 11/2011 |

(Continued)

OTHER PUBLICATIONS

"Solution for Group based Policing/Charging," SA WG2 Meeting #92, Barcelona, Spain, S2-122900, 3$^{rd}$ Generation Partnership Project, Valbonne, France (Jul. 9-13, 2012).

*Primary Examiner* — Allahyar Kasraian
(74) *Attorney, Agent, or Firm* — Leydig, Voit & Mayer, Ltd.

(57) ABSTRACT

Embodiments of the present disclosure provide a session processing method and apparatus of machine type communication. The method includes: receiving, by a first network device, a session request message; acquiring, by the first network device, subscription information according to a device parameter; and generating, by the first network device, a policy and charging control rule PCC rule of a subscriber of a UE according to the subscription information, carrying the PCC rule in a session response message, and sending the session response message. In the session processing method and apparatus according to the embodiments of the present disclosure, explicit binding of an MTC UE Category to a Low cost MTC service is implemented, so that it is ensured that the cost reduction technology does not affect the performance of a UE that belongs to an existing UE Category, thereby improving network performance of a communication system.

7 Claims, 23 Drawing Sheets

(51) Int. Cl.
*H04L 12/24* (2006.01)
*H04W 8/18* (2009.01)
*H04M 15/00* (2006.01)

(56) References Cited

U.S. PATENT DOCUMENTS

| | | |
|---|---|---|
| 2013/0044646 A1 | 2/2013 | Qu et al. |
| 2013/0070710 A1 | 3/2013 | Guo |
| 2013/0170347 A1 | 7/2013 | Zhang et al. |
| 2014/0038547 A1* | 2/2014 | Mo ............... H04L 12/1407 455/406 |

FOREIGN PATENT DOCUMENTS

| | | |
|---|---|---|
| CN | 102244855 A | 11/2011 |
| CN | 102387563 A | 3/2012 |
| CN | 102449955 A | 5/2012 |
| CN | 102547652 A | 7/2012 |
| EP | 2456122 A1 | 5/2012 |
| EP | 2566197 A1 | 3/2013 |

* cited by examiner

SESSION PROCESSING METHOD AND APPARATUS OF MACHINE TYPE COMMUNICATION

CROSS-REFERENCE TO RELATED APPLICATIONS

This application is a continuation of International Patent Application No. PCT/CN2012/081459, filed on Sep. 17, 2012, which is hereby incorporated by reference in its entirety.

TECHNICAL FIELD

Embodiments of the present disclosure relate to communications technologies, and in particular, to a session processing method and apparatus of machine type communication.

BACKGROUND

With the growing popularity of Machine Type Communication (MTC) services in life application and the communication field, more and more MTC UEs (User Equipments) tend to be terminals of a low cost and are designed for applications of a low data rate, for example, a smart meter reading service, a monitoring service, and a telemedicine service.

With the growth of MTC services, the MTC services increasingly depend on a GSM (Global System of Mobile communication)/GPRS (General Packet Radio Service) network. However, with the development of an LTE (Long Term Evolution) network, an operator intends to reduce Radio Access Technology (RAT), so as to decrease the maintenance cost of the whole network, and improve the utilization efficiency and value of frequency spectra. Therefore, low cost MTC UEs based on the LTE network are urgently demanded, so that a user is willing to migrate an MTC service from the GSM/GPRS network to the LTE network without increasing a UE cost.

SUMMARY

Embodiments of the present disclosure provide a session processing method and apparatus of machine type communication (MTC), so as to improve network performance of a communication system.

In a first aspect, an embodiment of the present disclosure provides a session processing method of machine type communication, including:

receiving, by a first network device, a session request message, where the session request message includes a device parameter, and the device parameter includes indication information used to indicate that a user equipment (UE) belongs to a machine type communication UE category;

acquiring, by the first network device, subscription information according to the device parameter, where the subscription information includes service information corresponding to the machine type communication UE category; and generating, by the first network device, a policy and charging control rule (PCC rule) of a subscriber of the UE according to the subscription information, sending the session response message carrying the PCC rule, where the PCC rule includes the service information corresponding to the machine type communication UE category.

In a first possible implementation manner, the acquiring, by the first network device, the subscription information according to the device parameter includes:

sending, by the first network device, a subscription information request message to a subscription profile repository (SPR) device, where the subscription information request message includes the device parameter, and receiving subscription information of the UE that is returned by the SPR device, where the subscription information of the UE is acquired by the SPR device according to the device parameter in the subscription information request message;

the session request message further includes an international mobile subscriber identity used to indicate the subscriber of the UE; and the generating, by the first network device, the policy and charging control rule PCC rule of the subscriber of the UE according to the subscription information includes:

generating, by the first network device, the PCC rule of the UE according to the received subscription information of the UE, and applying the PCC rule of the UE in the subscriber of the UE according to the international mobile subscriber identity.

In a second possible implementation manner, the acquiring, by the first network device, the subscription information according to the device parameter includes:

sending, by the first network device, a subscription information request message to a subscription profile repository (SPR) device, where the subscription information request message includes an international mobile subscriber identity used to indicate the subscriber of the UE and includes the device parameter, and receiving subscription information of the subscriber of the UE that is returned by the SPR device, where that the SPR device returns the subscription information of the subscriber of the UE includes:

acquiring, by the SPR device, subscription information of a category to which the UE belongs according to the device parameter in the subscription information request message, acquiring subscription information of the subscriber of the UE according to the international mobile subscriber identity in the subscription information request message, replacing service information in the subscription information of the subscriber of the UE with service information in the subscription information of the category to which the UE belongs, and returning the replaced subscription information of the subscriber of the UE to the first network device; and the generating, by the first network device, the policy and charging control rule PCC rule of the subscriber of the UE according to the subscription information includes:

generating, by the first network device, the PCC rule of the subscriber of the UE according to the received replaced subscription information of the subscriber of the UE.

With reference to the first aspect or the first or second possible implementation manner of the first aspect, in a third possible implementation manner, the device parameter is an international mobile equipment identity or an information element.

With reference to the first aspect or the first or second possible implementation manner of the first aspect, in a fourth possible implementation manner, the session request message is generated as triggered by an attach request message or a packet switched network connection establishment request message sent by the UE to a mobility management entity.

With reference to the third possible implementation manner of the first aspect, in a fifth possible implementation manner, the device parameter is an international mobile equipment identity; and the international mobile equipment identity in the session request message is sent by the UE to the first network device through a mobility management entity, a serving gateway, and a second network device.

With reference to the third possible implementation manner of the first aspect, in a sixth possible implementation manner, the device parameter is an information element;

the information element in the session request message is generated by a mobility management entity according to a reserved bitmap of a request type carried in an attach request message sent by the UE, and is sent to the first network device through a serving gateway and a second network device; and the reserved bitmap of the request type carried in the attach request message indicates that the UE belongs to the machine type communication UE category.

In a second aspect, an embodiment of the present disclosure provides a session processing method of machine type communication, including:

receiving, by a second network device, a session request message carrying a device parameter, where the device parameter includes indication information used to indicate that a user equipment (UE) belongs to a machine type communication UE category; and carrying, by the second network device, the device parameter in a policy and charging control rule (PCC rule) activation request message, sending the PCC rule activation request message to a first network device, and receiving a PCC rule activation request response message sent by the first network device, where the sending, by the first network device, the PCC rule activation request response message includes:

determining, by the first network device, a PCC rule identity according to the device parameter in the PCC rule activation request message, sending the PCC rule activation request response message carrying the PCC rule identity to the second network device; and determining, by the second network device, a PCC rule from a pre-configured PCC rule set according to the PCC rule identity in the PCC rule activation request response message, where the PCC rule includes service information of the machine type communication UE category.

In the first possible implementation manner, the device parameter is an international mobile equipment identity or an information element.

With reference to the second aspect or the first possible implementation manner of the second aspect, in a second possible implementation manner, the session request message is generated as triggered by an attach request message or a packet switched network connection establishment request message sent by the UE to a mobility management entity.

With reference to the first possible implementation manner of the second aspect, in a third possible implementation manner, the device parameter is an international mobile equipment identity; and the international mobile equipment identity in the session request message is sent by the UE to the second network device through a mobility management entity and a serving gateway.

With reference to the first possible implementation manner of the second aspect, in a fourth possible implementation manner, the device parameter is an information element;

the information element in the session request message is generated by a mobility management entity according to a reserved bitmap of a request type carried in an attach request message sent by the UE, and is sent to the second network device through a serving gateway; and the reserved bitmap of the request type carried in the attach request message indicates that the UE belongs to the machine type communication UE category.

In a third aspect, an embodiment of the present disclosure provides a network device, including:

a receiving unit, configured to receive a session request message, where the session request message includes a device parameter, and the device parameter includes indication information used to indicate that a user equipment (UE) belongs to a machine type communication UE category;

an acquisition unit, configured to acquire subscription information according to the device parameter, where the subscription information includes service information corresponding to the machine type communication UE category; and a response unit, configured to generate a policy and charging control rule (PCC rule) of a subscriber of the UE according to the subscription information, carry the PCC rule in a session response message, and send the session response message, where the PCC rule includes service information corresponding to the machine type communication UE category.

In a first possible implementation manner, the acquisition unit is further configured to send, to a subscription profile repository (SPR) device, a subscription information request message carrying the device parameter, and receive subscription information of the UE that is returned by the SPR device and acquired according to the device parameter in the subscription information request message;

the session request message further includes an international mobile subscriber identity used to indicate the subscriber of the UE; and the response unit is further configured to generate the PCC rule of the UE according to the received subscription information of the UE, and apply the PCC rule of the UE in the subscriber of the UE according to the international mobile subscriber identity.

In a second possible implementation manner, the acquisition unit is further configured to send, to a subscription profile repository (SPR) device, a subscription information request message that includes an international mobile subscriber identity used to indicate the subscriber of the UE and includes the device parameter, and receive subscription information of the subscriber of the UE that is returned by the SPR device, where the returning, by the SPR device, the subscription information of the subscriber of the UE includes:

acquiring, by the SPR device, the subscription information of a category to which the UE belongs according to the device parameter in the subscription information request message, acquiring the subscription information of the subscriber of the UE according to the international mobile subscriber identity in the subscription information request message, replacing service information in the subscription information of the subscriber of the UE with service information in the subscription information of the category to which the UE belongs, and sending the replaced subscription information of the subscriber of the UE to the response unit; and the response unit is further configured to generate the PCC rule of the subscriber of the UE according to the received replaced subscription information of the subscriber of the UE.

In a fourth aspect, an embodiment of the present disclosure provides a network device, including:

a receiving unit, configured to receive a session request message carrying a device parameter, where the device parameter includes indication information used to indicate that a user equipment (UE) belongs to a machine type communication UE category;

an activation request unit, configured to carry the device parameter in a policy and charging control rule (PCC rule) activation request message, send the PCC rule activation request message to a first network device, and receive a PCC rule activation request response message sent by the first network device, where the sending, by the first network device, the PCC rule activation request response message includes:

determining, by the first network device, a PCC rule identity according to the device parameter in the PCC rule activation request message, carrying the PCC rule identity in the PCC rule activation request response message of the PCC rule identity, and sending the PCC rule activation request response message; and a response unit, configured to determine a PCC rule from a pre-configured PCC rule set according to the PCC rule identity in the PCC rule activation request response message, where the PCC rule includes service information of the machine type communication UE category.

As seen from the above technical solutions, in the session processing method and apparatus of machine type communication according to the embodiments of the present disclosure, the first network device receives a create IP-CAN (IP (Internet Protocol) Connectivity Access Network) session request message, acquires subscription information according to a device parameter, generates a PCC rule of a subscriber of a UE according to the subscription information, carries the PCC rule of the subscriber of the UE in a create IP-CAN session response message, and sends the create IP-CAN session response message. The create IP-CAN session request message carries the device parameter which is used to indicate the UE and includes indication information used to indicate that the UE belongs to a machine type communication UE category, the subscription information includes service information of the machine type communication UE category, and the PCC rule includes the service information of the machine type communication UE category; therefore, explicit binding of a MTC UE Category to a Low cost MTC service is implemented, so that a Low cost MTC UE adopting the MTC UE Category can merely use a specified MTC service, and a non-Low cost MTC UE cannot use the above specified MTC service. In this way, it is ensured that the cost reduction technology does not affect the performance of a UE that belongs to an existing UE Category, thereby improving network performance of a communication system.

BRIEF DESCRIPTION OF DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

DESCRIPTION OF EMBODIMENTS

In order to make the objectives, technical solutions, and advantages of the present disclosure more comprehensible, the technical solutions according to embodiments of the present disclosure are clearly and completely described in the following with reference to the accompanying drawings. The embodiments in the following description are merely a part rather than all of the embodiments of the present disclosure. All other embodiments obtained by persons of ordinary skill in the art based on the embodiments of the present disclosure without creative efforts shall fall within the protection scope of the present disclosure.

Figure 1:
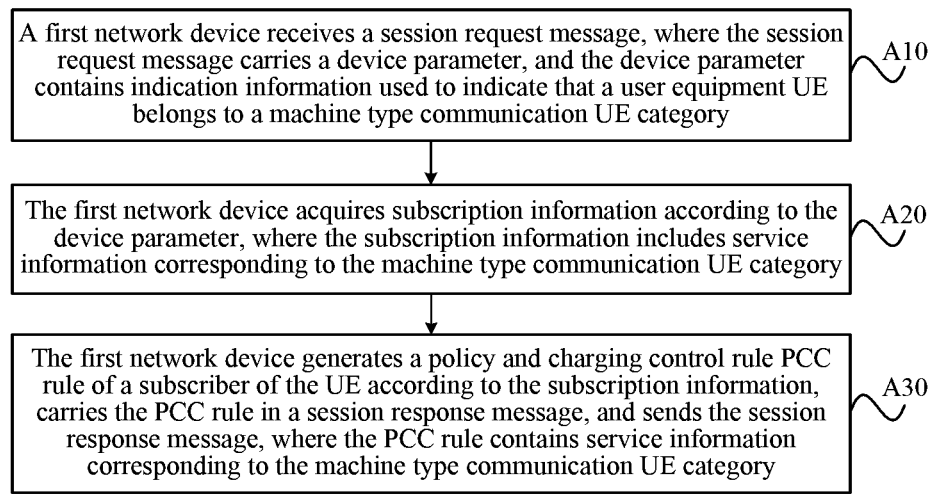
FIG. 1 is a flow chart of a first session processing method of machine type communication according to an embodiment of the present disclosure.

FIG. 1 is a flow chart of a first session processing method of machine type communication according to an embodiment of the present disclosure. As shown in FIG. 1, the session processing method of machine type communication according to this embodiment may be applied in a session processing procedure of a UE that belongs to an MTC UE category in a communication system. The MTC UE category may indicate that the UE is a low cost MTC UE. The UE may be an Internet of Things terminal applied in a smart meter reading service, a monitoring service, and a telemedicine service and the like, and may also be other low cost mobile terminals. The communication system may be an LTE communication system, and the LTE communication system may include a Packet Data Network Gateway (PDN GW), a Serving Gateway (Serving GW), a Mobility Management Entity (MME), a Policy and Charging Enforcement Function (PCEF) entity, a Policy and Charging Rules Function (PCRF) entity, a Subscription Profile Repository (SPR) device, and the like.

The session processing method of machine type communication according to this embodiment may include:

Step A10: A first network device receives a session request message, where the session request message carries a device parameter, and the device parameter includes indication information used to indicate that a user equipment UE belongs to a machine type communication UE category.

In some embodiments, in an LTE communication system, a PCRF may be used as the first network device; and, in other communication systems, a network element with a similar function may be used as the first network device.

The first network device receives a session request message, where the session request message may be a create IP-CAN session request message, and the create IP-CAN session request message may be sent by a second network device. In the LTE communication system, a PCEF or a PDN GW may be used as the second network device; and, in other communication systems, a network element with a similar function may be used as the second network device. The create IP-CAN session request message may be generated as triggered by an attach request message or a packet switched network PDN connection establishment request message sent by the UE to a network side. The create IP-CAN session request message carries a device parameter; and in an actual application, the create IP-CAN session request message may further carry an international mobile subscriber identity (IMSI), where the IMSI may indicate a subscriber of the UE, that is, each subscriber has a unique IMSI, and the device parameter is used to indicate the UE, that is, each UE has a unique device parameter. When the UE belongs to an MTC UE category of Low cost MTC UEs, the device parameter includes indication information used to indicate that the UE belongs to the MTC UE category, where the indication information may be a field.

In the actual application, the device parameter may be implemented by using existing information used to identify a device, for example, the device parameter may be an international mobile equipment identity (IMEI), where the IMEI may include the following fields:

<TAC><SNR><CD/SD> where:

TAC: 8 bits, type allocation code (TAC), which is a code for differentiating a brand and a model of a UE, and is allocated by the global system for mobile communications assembly (GSMA for short) and its authorized body;

SNR: 6 bits, serial number (SNR), used to differentiate a production serial number of each UE; and CD/SD: 1 bit, verification code (CD/SD), obtained through the Luhn (mod 10) algorithm by using the first 14 digits.

A field in the IMEI may be preset to indicate that the UE belongs to the MTC UE category.

The device parameter may also be redefined indication information, for example, an attach request message sent by the UE to an MME may carry a request type, a reserved bitmap of the request type may indicate that the UE belongs to the MTC UE category, and the MME may generate information element (IE) according to the reserved bitmap in the request type, where the device parameter may be the IE.

In some embodiments, the device parameter may also be implemented in other forms, as long as the purpose for indicating that the UE belongs to the MTC UE category is achieved, which is not limited by this embodiment.

The create IP-CAN session request message may also carry information such as an APN (Access Point Name) and an IP (Internet Protocol) address of the UE.

Step A20: The first network device acquires subscription information according to the device parameter, where the subscription information includes service information corresponding to the machine type communication UE category.

The first network device acquires subscription information according to the device parameter, where the subscription information may be pre-stored in the first network device, or stored in an SPR device or other network devices. The subscription information is indexed by the device parameter, and the subscription information corresponding to the device parameter can be found through the device parameter. The subscription information may be subscription information corresponding to the UE or subscription information corresponding to a category to which the UE belongs. When the subscription information is the subscription information corresponding to the category to which the UE belongs, the category to which the UE belongs can be determined according to the device parameter of the UE, so as to acquire the subscription information of the category to which the UE belongs.

Step A30: The first network device generates a policy and charging control rule (PCC rule) of a subscriber of the UE according to the subscription information, carries the PCC rule in a session response message, and sends the session response message, where the PCC rule includes the service information corresponding to the machine type communication UE category.

The first network device generates a PCC rule of the subscriber of the UE according to the acquired subscription information, where the PCC rule includes service information of the MTC UE category, and the service information may include information such as a service type. The first network device carries the PCC rule in a session response message and sends the session response message to a second network device, where the session response message may be a create IP-CAN session response message. Because the PCC rule includes the service information corresponding to the machine type communication UE category, the second network device may perform corresponding policy and charging processing according to the service information corresponding to the machine type communication UE category.

In the session processing method of machine type communication according to this embodiment, the first network device receives a session request message, where the session request message carries a device parameter, and the device parameter includes indication information used to indicate that the user equipment UE belongs to a machine type communication UE category; acquires subscription information according to the device parameter, where the subscription information includes service information corresponding to the machine type communication UE category;

generates a policy and charging control rule PCC rule of a subscriber of the UE according to the subscription information, carries the PCC rule in a session response message, and sends the session response message, where the PCC rule includes the service information corresponding to the machine type communication UE category. The session request message carries the device parameter, the device parameter is used to indicate the UE, the device parameter includes the indication information used to indicate that the UE belongs to the machine type communication UE category, the subscription information includes the service information of the machine type communication UE category, and the PCC rule includes the service information of the machine type communication UE category; therefore, explicit binding of the MTC UE Category to a Low cost MTC service is implemented, so that a Low cost MTC UE adopting the MTC UE Category can merely use a specified MTC service, and a non-Low cost MTC UE cannot use the above specified MTC service. In this way, it is ensured that the cost reduction technology does not affect the performance of a UE that belongs to an existing UE Category, thereby improving network performance of a communication system.

In this embodiment, in step A20, acquiring, by the first network device, the subscription information according to the device parameter may be:

sending, by the first network device, a subscription information request message to a subscription profile repository SPR device, where the subscription information request message carries the device parameter, and receiving subscription information of the UE that is returned by the SPR device and acquired according to the device parameter in the subscription information request message; and the session request message further carries an international mobile subscriber identity used to indicate the subscriber of the UE.

In step A30, generating, by the first network device, the policy and charging control rule PCC rule of the subscriber of the UE according to the subscription information may be:

generating, by the first network device, the PCC rule of the UE according to the received subscription information of the UE, and applying the PCC rule of the UE in the subscriber of the UE according to the international mobile subscriber identity.

In one implementation, the subscription information of the UE is stored in the SPR device, the subscription information of the UE includes service information applicable to the MTC UE Category, and the service information may include information such as the service type. The SPR device may find corresponding subscription information according to the device parameter of the UE. The first network device may first determine whether the subscription information is stored locally; and if not, send a subscription information request message to the SPR device, where the subscription request message carries the IMSI and the device parameter. The SPR device acquires, according to the device parameter, the subscription information of the UE corresponding to the device parameter from the stored subscription information, and sends the subscription information of the UE to the first network device. The SPR device may carry the subscription information of the UE in a subscription information response message and send the subscription information response message to the first network device.

The first network device may generate the PCC rule of the UE according to the subscription information of the UE, and then apply the PCC rule of the UE in the subscriber of the UE according to the IMSI, so as to generate the PCC rule of the subscriber of the UE.

In this embodiment, in step A20, acquiring, by the first network device, the subscription information according to the device parameter may be:

sending, by the first network device, a subscription information request message to a subscription profile repository SPR device, where the subscription information request message carries an international mobile subscriber identity used to indicate the subscriber of the UE and carries the device parameter, and receiving subscription information of the subscriber of the UE that is returned by the SPR device, where returning, by the SPR device, the subscription information of the subscriber of the UE is:

acquiring, by the SPR device, subscription information of a category to which the UE belongs according to the device parameter in the subscription information request message, acquiring subscription information of the subscriber of the UE according to the international mobile subscriber identity in the subscription information request message, replacing service information in the subscription information of the subscriber of the UE with service information in the subscription information of the category to which the UE belongs, and returning the replaced subscription information of the subscriber of the UE to the first network device.

In step A30, generating, by the first network device, the policy and charging control rule PCC rule of the subscriber of the UE according to the subscription information may be:

generating, by the first network device, the PCC rule of the subscriber of the UE according to the received replaced subscription information of the subscriber of the UE.

In another implementation, both subscription information of a category to which the UE belongs and subscription information of the subscriber of the UE are stored in the SPR device, where the subscription information of the category to which the UE belongs includes service information applicable to the MTC UE Category, and the service information may include information such as the service type. The SPR device determines the category to which the UE belongs according to the device parameter of the UE, and finds corresponding subscription information. The first network device may first determine whether the subscription information is stored locally; and if not, send a subscription information request message to the SPR device, where the subscription request message carries the IMSI and the device parameter. The SPR device acquires the subscription information of the category to which the UE belongs according to the device parameter of the UE, and acquires the subscription information of the subscriber of the UE according to the device parameter of the UE. The service information in the subscription information of the subscriber of the UE is replaced with the service information in the subscription information of the category to which the UE belongs, and the replaced subscription information of the subscriber of the UE is sent to the first network device. In some embodiments, the replaced subscription information of the subscriber of the UE may be carried in a subscription information response message, and the subscription information response message is then sent to the first network device.

The first network device may generate the PCC rule of the subscriber of the UE according to the replaced subscription information of the subscriber of the UE.

In this embodiment, the device parameter is an international mobile equipment identity or an information element.

In this embodiment, the session request message is generated as triggered by an attach request message or a packet switched network PDN connection establishment request message sent by the UE to the mobility management entity.

In some embodiments, after the UE is powered on, an initial attachment process is triggered, the UE sends an attach request message to the MME at the network side to establish a connection to the network side, and the UE may further send a PDN connection establishment request message to the MME to establish a new PDN connection.

In this embodiment, the device parameter is an international mobile equipment identity, and the international mobile equipment identity in the session request message is sent by the UE to the first network device through the mobility management entity, a serving gateway, and the second network device.

The international mobile subscriber identity in the session request message is sent by the mobility management entity to the first network device through the serving gateway and the second network device.

In this embodiment, the device parameter is an information element; the information element in the session request message is generated by the mobility management entity according to a reserved bitmap of a request type carried in the attach request message sent by the UE, and is sent to the first network device through the serving gateway and the second network device; and the reserved bitmap of the request type carried in the attach request message indicates that the UE belongs to the machine type communication UE category.

The international mobile subscriber identity in the session request message is sent by the mobility management entity to the first network device through the serving gateway and the second network device.

In the actual application, the device parameter, a triggering process of the session request message, and the type of the subscription information may be implemented in various manners; and the session processing method of machine type communication according to this embodiment is described in detail through examples of different application scenarios in the LTE communication system.

Figure 2A:
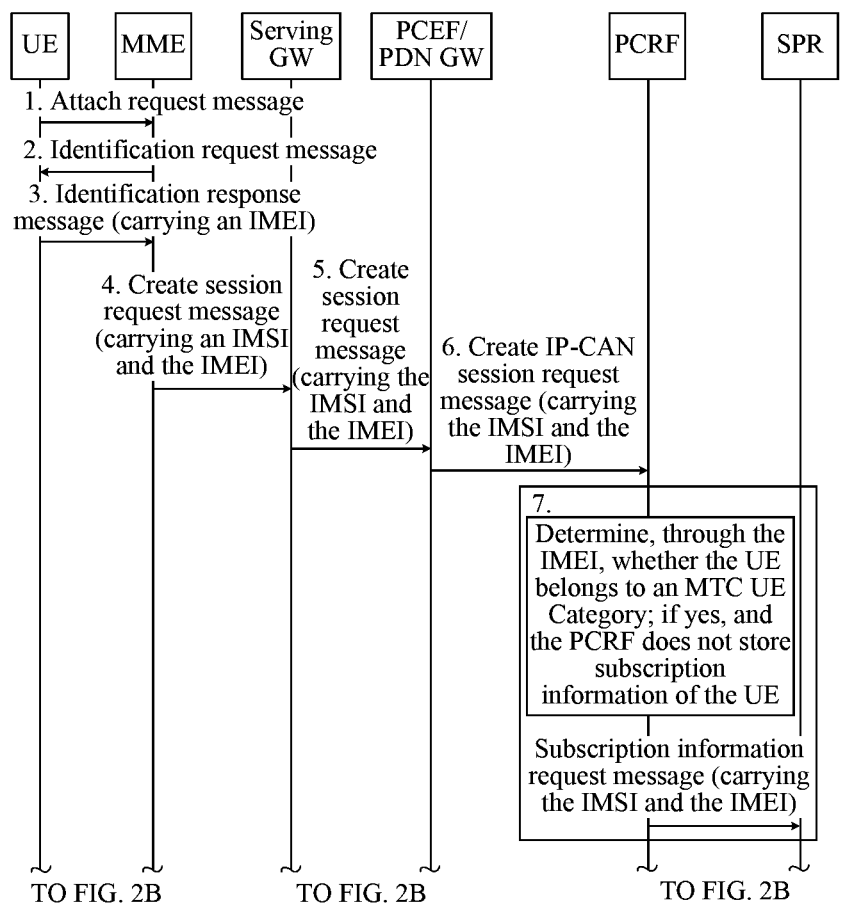
FIG. 2A and FIG. 2B are a signaling diagram of a first session processing method of machine type communication according to an embodiment of the present disclosure.
Figure 2B:
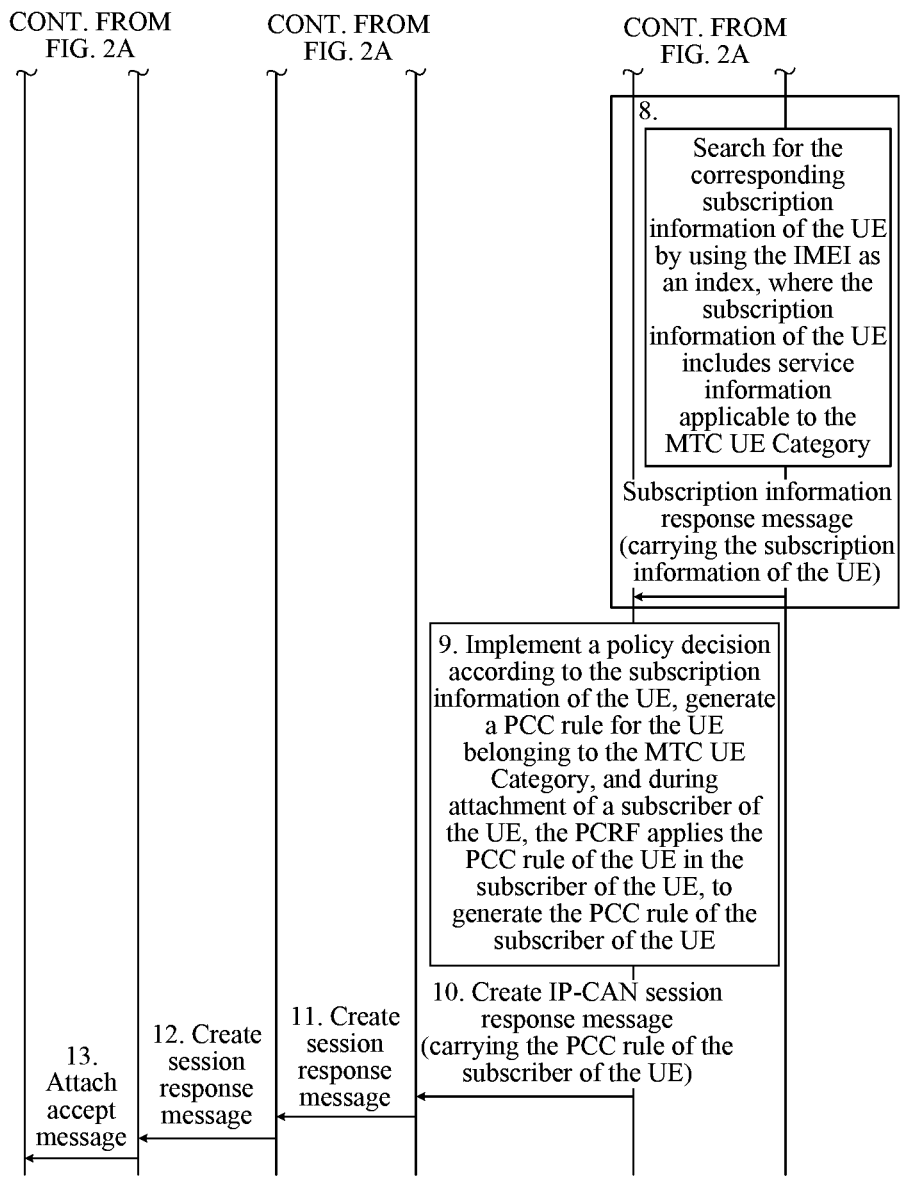

FIG. 2A and FIG. 2B are a signaling diagram of a first session processing method of machine type communication according to an embodiment of the present disclosure. As shown in FIG. 2A and FIG. 2B, subscription information of a UE is stored in an SPR device, the subscription information of the UE includes service information applicable to an MTC UE Category, the service information may include information such as a service type, and a device parameter is an IMEI. This session processing procedure of machine type communication includes:

Step 1: A UE sends an attach request message to an MME.

Step 2: The MME sends an identification request message to the UE.

Step 3: The UE sends an identification response message to the MME, where the identification response message carries an IMEI, the IMEI may indicate that the UE belongs to an MTC UE Category, and the identification response message may also carry information used to generate an IMSI.

Step 4: The MME sends a create session request message to a Serving GW, where the create session request message carries an IMSI and the IMEI, and the IMSI may be generated by the MME according to the information which is used to generate the IMSI and is in the received identification response message or may be acquired according to the identification response message.

Step 5: The Serving GW forwards the create session request message to a PCEF/PDN GW.

Step 6: The PCEF/PDN GW sends a create IP-CAN session request message to a PCRF, where the create IP-CAN session request message carries the IMSI and the IMEI.

Step 7: The PCRF determines, through the IMEI, whether the UE belongs to the MTC UE Category; if yes, and the PCRF does not store subscription information of the UE, the PCRF sends a subscription information request message to an SPR, where the subscription information request message carries the IMSI and the IMEI.

Step 8: The SPR device searches for the corresponding subscription information of the UE by using the IMEI as an index, where the subscription information of the UE includes service information applicable to the MTC UE Category; and the SPR device sends, to the PCRF, a subscription information response message carrying the subscription information of the UE.

Step 9: The PCRF implements a policy decision according to the subscription information of the UE, generates a PCC rule for the UE belonging to the MTC UE Category, and during attachment of a subscriber of the UE, the PCRF applies the PCC rule of the UE in the subscriber of the UE, to generate the PCC rule of the subscriber of the UE.

Step 10: The PCRF sends a create IP-CAN session response message to a PCEF/PDN GW, where the create IP-CAN session response message carries the PCC rule of the subscriber of the UE.

Step 11: The PCEF/PDN GW sends a create session response message to the Serving GW.

Step 12: The Serving GW sends the create session response message to the MME.

Step 13: The MME sends an attach accept message to the UE.

When the UE is powered on, the above initial attachment process is triggered to establish a connection to a network side; and the UE may further send a PDN connection establishment request message to the MME to establish a new PDN connection.

Figure 3A:
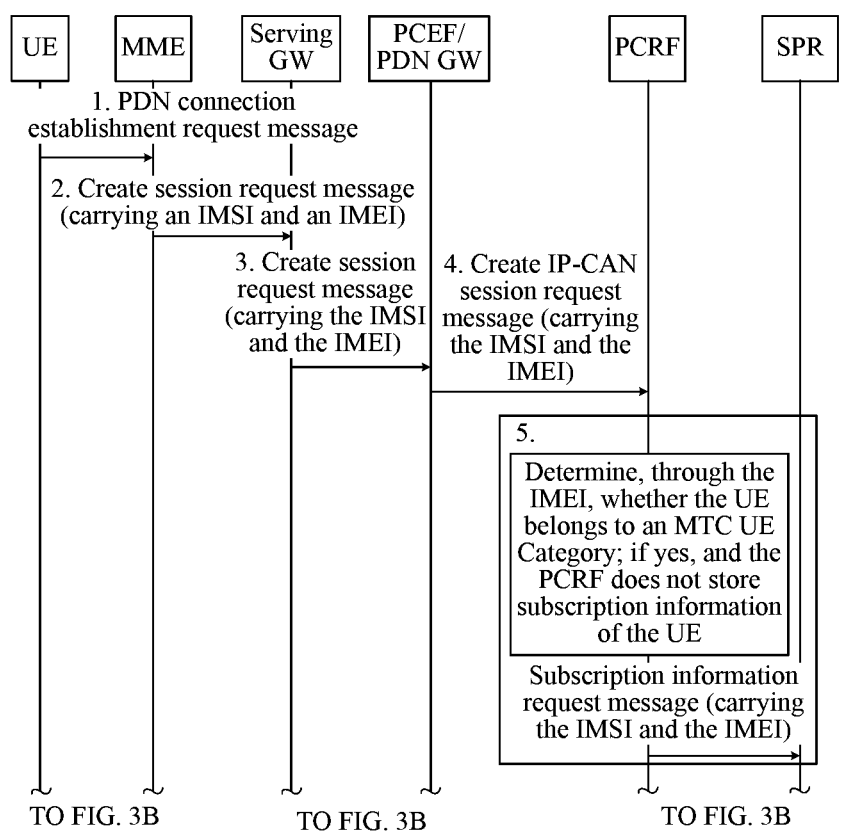
FIG. 3A and FIG. 3B are a signaling diagram of a second session processing method of machine type communication according to an embodiment of the present disclosure.
Figure 3B:
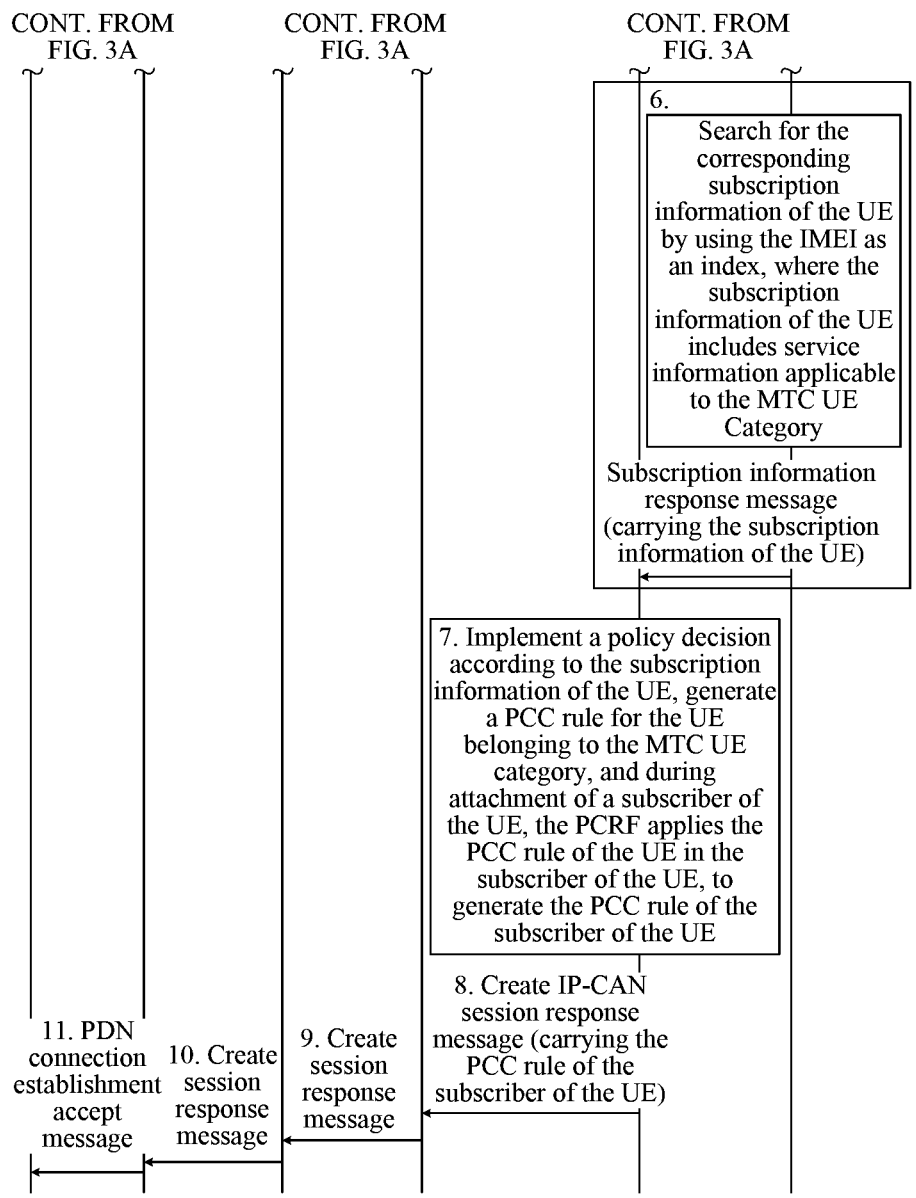

FIG. 3A and FIG. 3B are a signaling diagram of a second session processing method of machine type communication according to an embodiment of the present disclosure. As shown in FIG. 3A and FIG. 3B, this session processing procedure of machine type communication includes:

Step 1: A UE sends a PDN connection establishment request message to an MME.

Step 2: The MME sends a create session request message to a Serving GW, where the create session request message carries an IMSI and an IMEI, and the IMEI may indicate that the UE belongs to an MTC UE Category.

Step 3: The Serving GW forwards the create session request message to a PCEF/PDN GW.

Step 4: The PCEF/PDN GW sends a create IP-CAN session request message to a PCRF, where the create IP-CAN session request message carries the IMSI and the IMEI.

Step 5: The PCRF determines, through the IMEI, whether the UE belongs to the MTC UE Category; if yes, and the PCRF does not store subscription information of the UE, the PCRF sends a subscription information request message to an SPR, where the subscription information request message carries the IMSI and the IMEI.

Step 6: The SPR device searches for the corresponding subscription information of the UE by using the IMEI as an index, where the subscription information of the UE includes service information applicable to the MTC UE Category; and the SPR device sends, to the PCRF, a subscription information response message carrying the subscription information of the UE.

Step 7: The PCRF implements a policy decision according to the subscription information of the UE, generates a PCC rule for the UE belonging to the MTC UE Category, and during attachment of a subscriber of the UE, the PCRF applies the PCC rule of the UE in the subscriber of the UE, to generate the PCC rule of the subscriber of the UE.

Step 8: The PCRF sends a create IP-CAN session response message to a PCEF/PDN GW, where the create IP-CAN session response message carries the PCC rule of the subscriber of the UE.

Step 9: The PCEF/PDN GW sends a create session response message to the Serving GW.

Step 10: The Serving GW sends the create session response message to the MME.

Step 11: The MME sends a PDN connection establishment accept message to the UE.

Figure 4A:
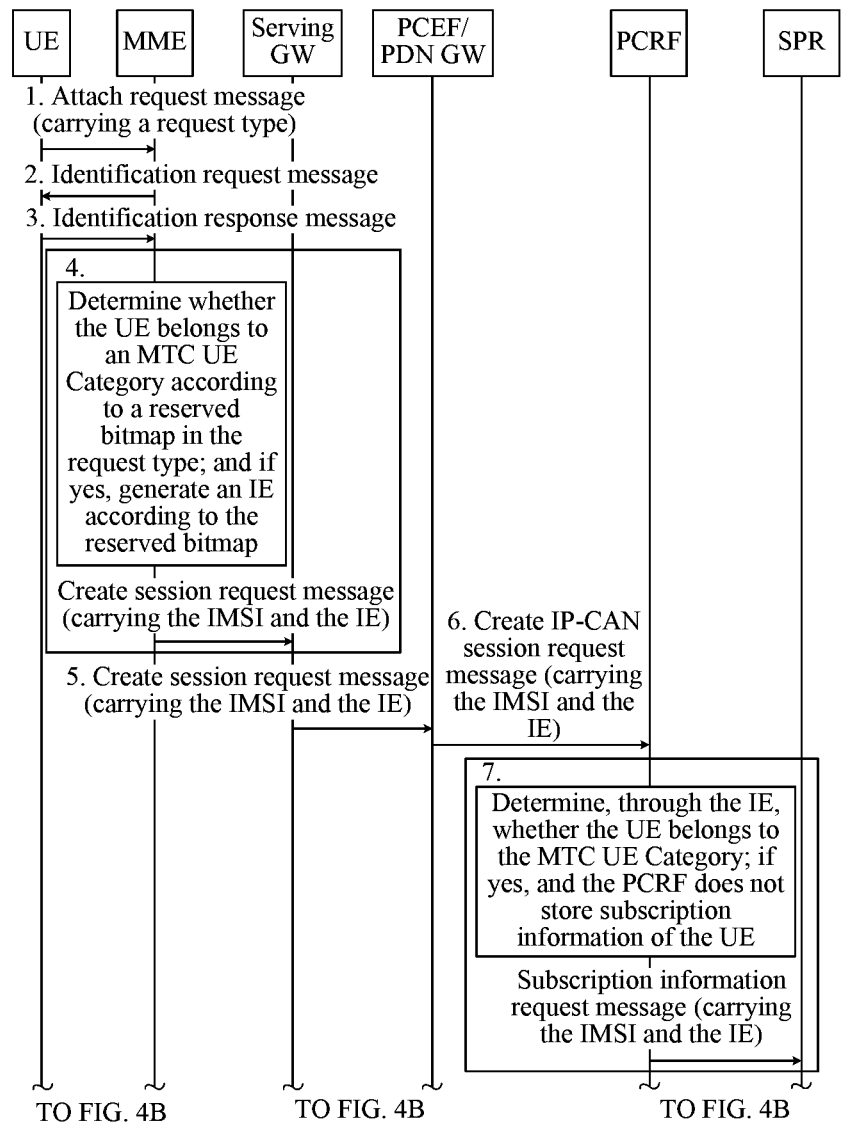
FIG. 4A and FIG. 4B are a signaling diagram of a third session processing method of machine type communication according to an embodiment of the present disclosure.
Figure 4B:
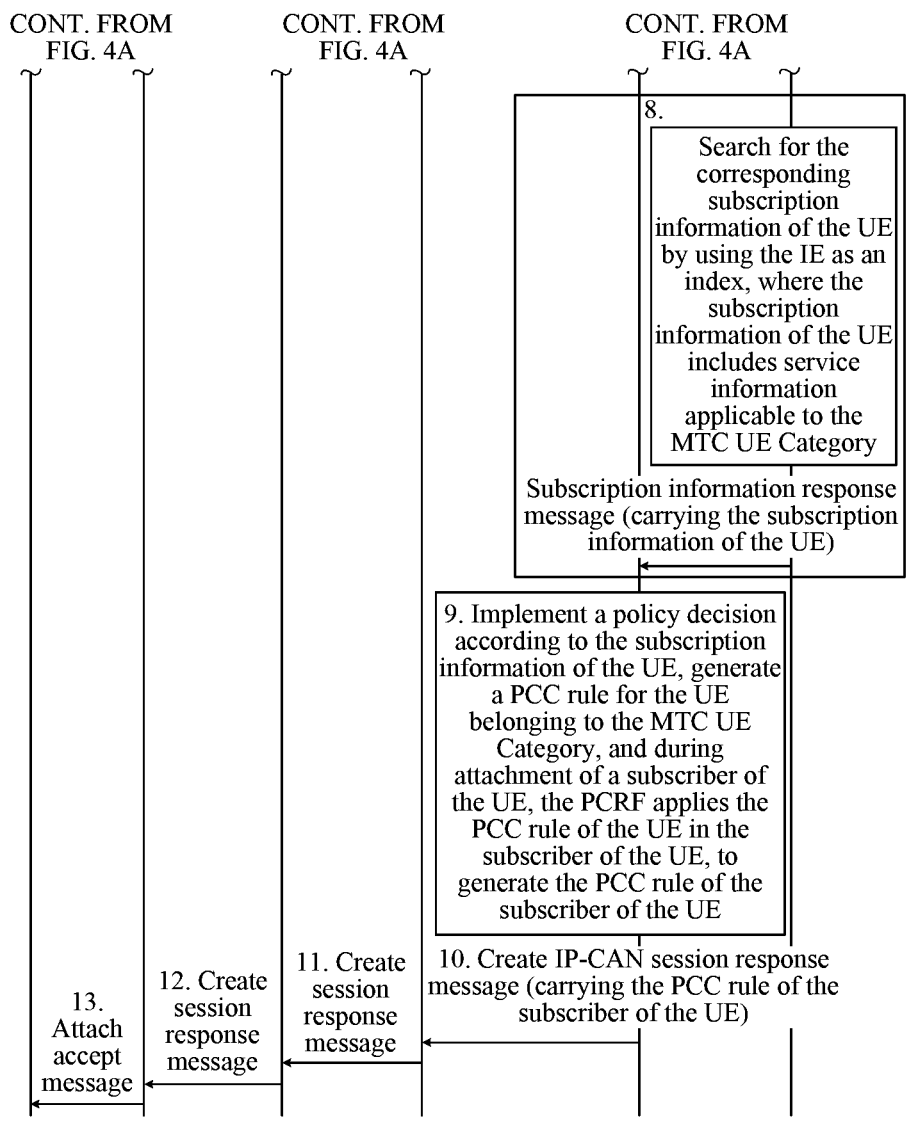

FIG. 4A and FIG. 4B are a signaling diagram of a third session processing method of machine type communication according to an embodiment of the present disclosure. As shown in FIG. 4A and FIG. 4B, subscription information of a UE is stored in an SPR device, the subscription information of the UE includes service information applicable to an MTC UE Category, the service information may include information such as a service type, and a device parameter is an IE. This session processing procedure of machine type communication includes:

Step 1: A UE sends an attach request message to an MME, where the attach request message carries a request type, the request type includes a reserved bitmap, and the reserved bitmap in the request type may indicate that the UE belongs to an MTC UE Category.

Step 2: The MME sends an identification request message to the UE.

Step 3: The UE sends an identification response message to the MME, where the identification response message may carry information used to generate an IMSI.

Step 4: The MME determines, according to the reserved bitmap in the request type, whether the UE belongs to the MTC UE Category; and if yes, generates an IE according to the reserved bitmap, and sends a create session request message to a Serving GW, where the create session request message carries an IMSI and the IE, and the IMSI may be generated by the MME according to the information which is used to generate the IMSI and is in the received identification response message or may be acquired according to the identification response message.

Step 5: The Serving GW forwards the create session request message to a PCEF/PDN GW.

Step 6: The PCEF/PDN GW sends a create IP-CAN session request message to a PCRF, where the create IP-CAN session request message carries the IMSI and the IE.

Step 7: The PCRF determines, through the IE, whether the UE belongs to the MTC UE Category; if yes, and the PCRF does not store subscription information of the UE, the PCRF sends a subscription information request message to an SPR, where the subscription information request message carries the IMSI and the IE.

Step 8: The SPR device searches for the corresponding subscription information of the UE by using the IE as an index, where the subscription information of the UE includes service information applicable to the MTC UE Category; and the SPR device sends, to the PCRF, a subscription information response message carrying the subscription information of the UE.

Step 9: The PCRF implements a policy decision according to the subscription information of the UE, generates a PCC rule for the UE belonging to the MTC UE Category, and during attachment of a subscriber of the UE, the PCRF applies the PCC rule of the UE in the subscriber of the UE, to generate the PCC rule of the subscriber of the UE.

Step 10: The PCRF sends a create IP-CAN session response message to a PCEF/PDN GW, where the create IP-CAN session response message carries the PCC rule of the subscriber of the UE.

Step 11: The PCEF/PDN GW sends a create session response message to the Serving GW.

Step 12: The Serving GW sends the create session response message to the MME.

Step 13: The MME sends an attach accept message to the UE.

When the UE is powered on, the above initial attachment process is triggered to establish a connection to a network side; and the UE may further send a PDN connection establishment request message to the MME to establish a new PDN connection.

Figure 5A:
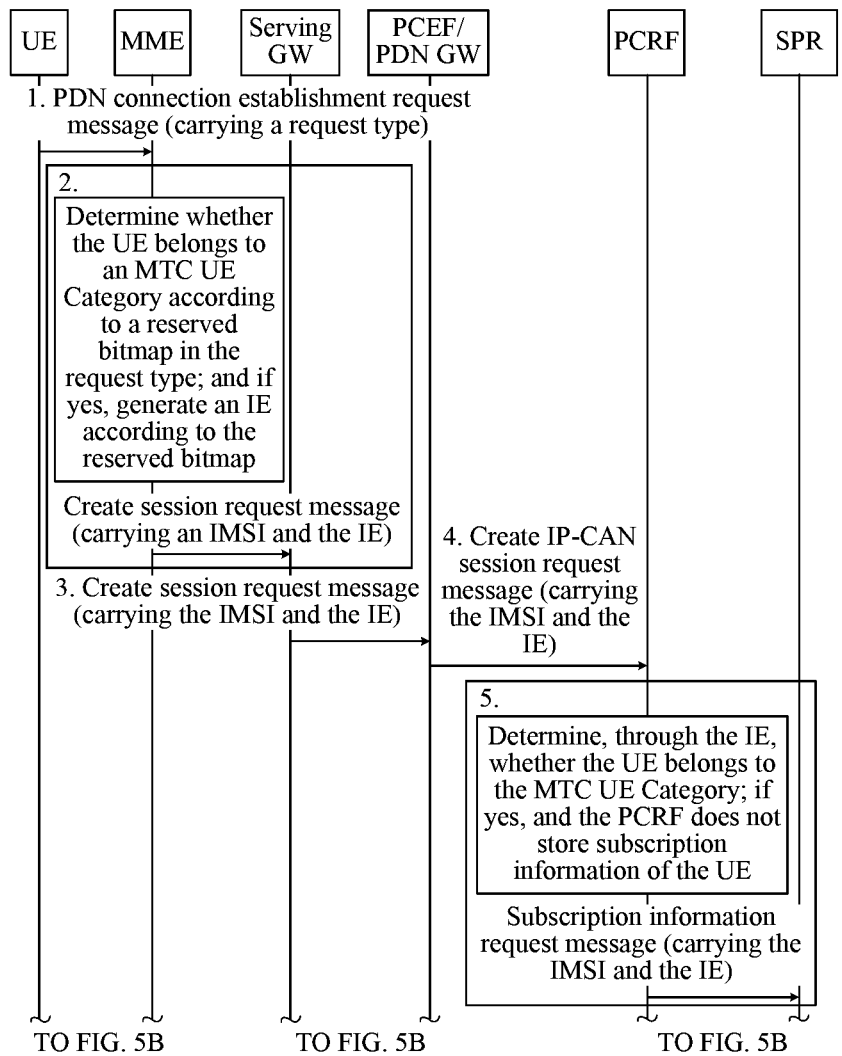
FIG. 5A and FIG. 5B are a signaling diagram of a fourth session processing method of machine type communication according to an embodiment of the present disclosure.
Figure 5B:
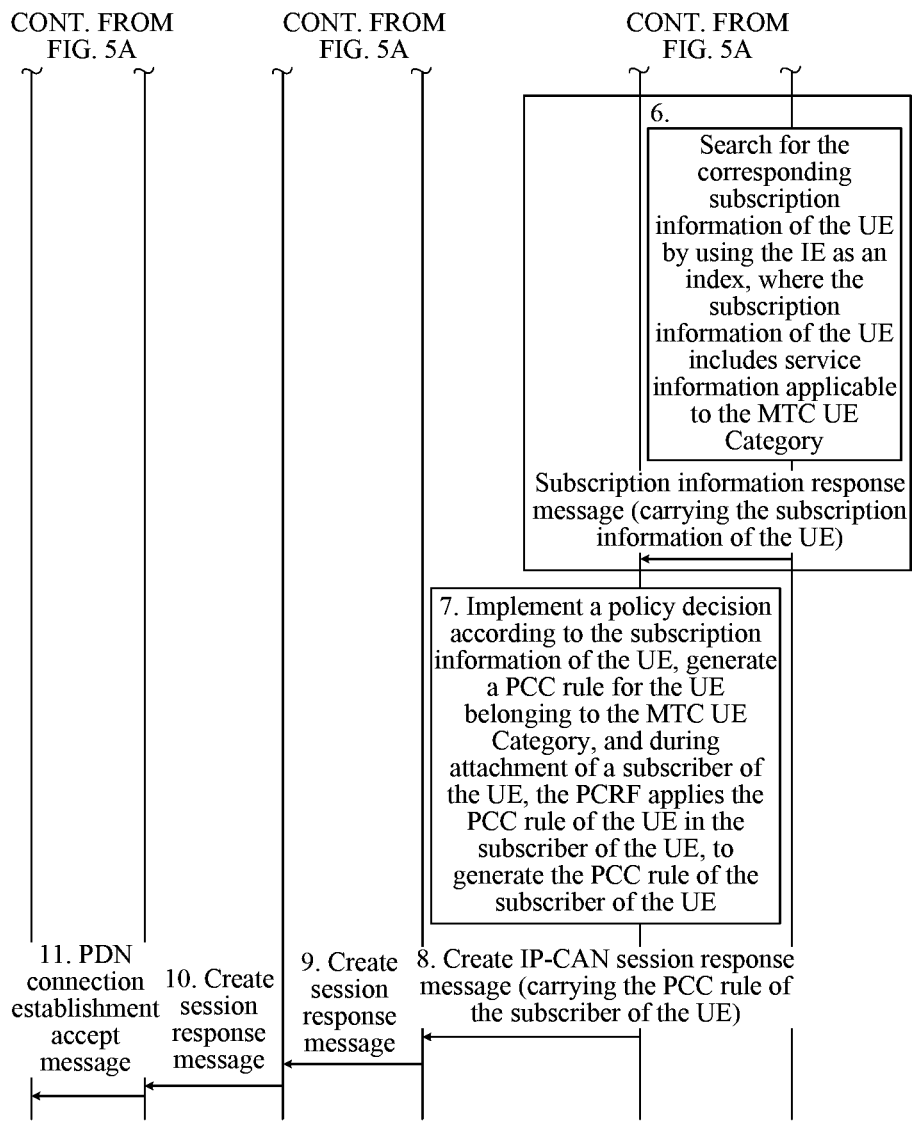

FIG. 5A and FIG. 5B are a signaling diagram of a fourth session processing method of machine type communication according to an embodiment of the present disclosure. As shown in FIG. 5A and FIG. 5B, this session processing procedure of machine type communication includes:

Step 1: A UE sends a PDN connection establishment request message to an MME, where the PDN connection establishment request message carries a request type, the request type includes a reserved bitmap, and the reserved bitmap in the request type may indicate that the UE belongs to an MTC UE Category.

Step 2: The MME determines, according to the reserved bitmap in the request type, whether the UE belongs to the MTC UE Category; and if yes, generates an IE according to the reserved bitmap, and sends a create session request message to a Serving GW, where the create session request message carries an IMSI and the IE.

Step 3: The Serving GW forwards the create session request message to a PCEF/PDN GW.

Step 4: The PCEF/PDN GW sends a create IP-CAN session request message to a PCRF, where the create IP-CAN session request message carries the IMSI and the IE.

Step 5: The PCRF determines, through the IE, whether the UE belongs to the MTC UE Category; if yes, and the PCRF does not store subscription information of the UE, the PCRF sends a subscription information request message to an SPR, where the subscription information request message carries the IMSI and the IE.

Step 6: The SPR device searches for the corresponding subscription information of the UE by using the IE as an index, where the subscription information of the UE includes service information applicable to the MTC UE Category; and the SPR device sends, to the PCRF, a subscription information response message carrying the subscription information of the UE.

Step 7: The PCRF implements a policy decision according to the subscription information of the UE, generates a PCC rule for the UE belonging to the MTC UE Category, and during attachment of a subscriber of the UE, the PCRF applies the PCC rule of the UE in the subscriber of the UE, to generate the PCC rule of the subscriber of the UE.

Step 8: The PCRF sends a create IP-CAN session response message to a PCEF/PDN GW, where the create IP-CAN session response message carries the PCC rule of the subscriber of the UE.

Step 9: The PCEF/PDN GW sends a create session response message to the Serving GW.

Step 10: The Serving GW sends the create session response message to the MME.

Step 11: The MME sends a PDN connection establishment accept message to the UE.

Figure 6A:
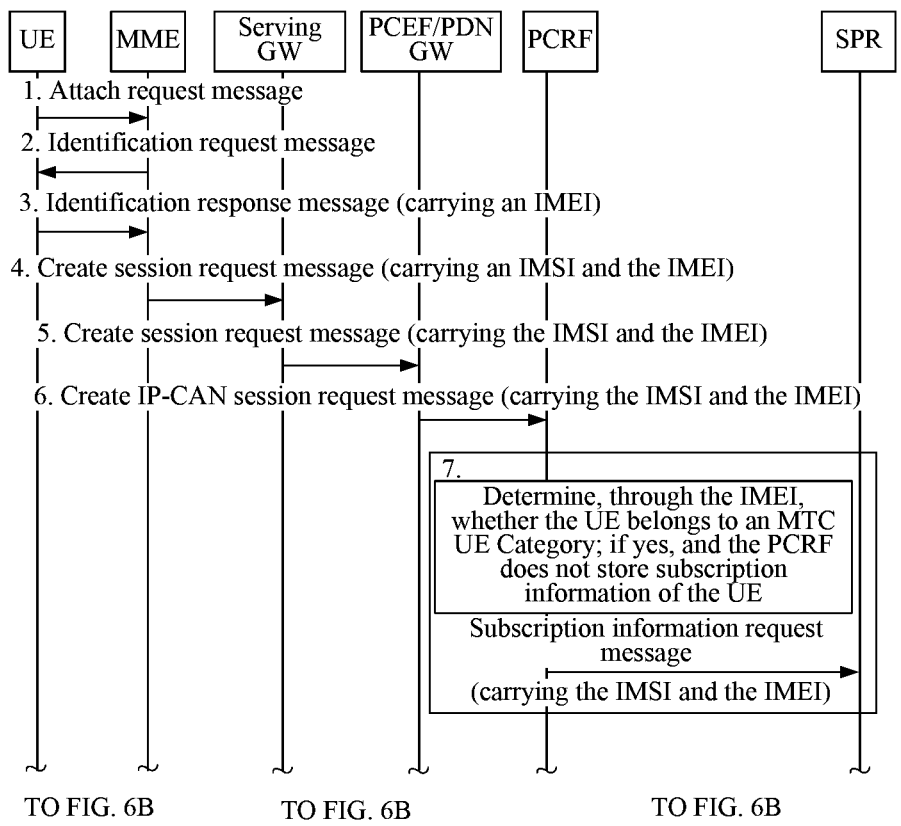
FIG. 6A and FIG. 6B are a signaling diagram of a fifth session processing method of machine type communication according to an embodiment of the present disclosure.
Figure 6B:
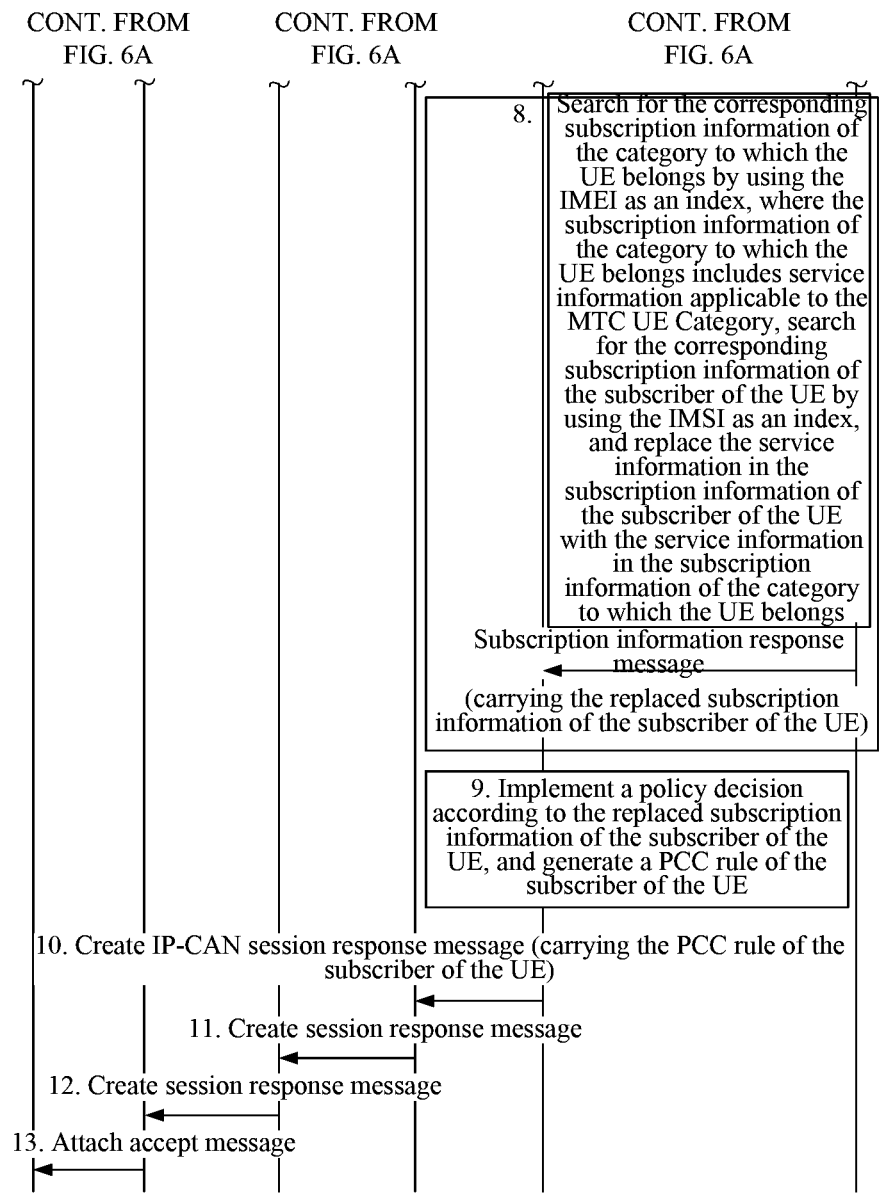

FIG. 6A and FIG. 6B are a signaling diagram of a fifth session processing method of machine type communication according to an embodiment of the present disclosure. As shown in FIG. 6A and FIG. 6B, subscription information of a category to which a UE belongs and subscription information of a subscriber of the UE are stored in an SPR device, the subscription information of the category to which the UE belongs includes service information applicable to an MTC UE Category, the service information may include information such as a service type, and a device parameter is an IMEI. This session processing procedure of machine type communication includes:

Step 1: A UE sends an attach request message to an MME.

Step 2: The MME sends an identification request message to the UE.

Step 3: The UE sends an identification response message to the MME, where the identification response message carries an IMEI, the IMEI may indicate that the UE belongs to an MTC UE Category, and the identification response message may also carry information used to generate an IMSI.

Step 4: The MME sends a create session request message to a Serving GW, where the create session request message carries an IMSI and the IMEI, and the IMSI may be generated by the MME according to the information which is used to generate the IMSI and is in the received identification response message or may be acquired according to the identification response message.

Step 5: The Serving GW forwards the create session request message to a PCEF/PDN GW.

Step 6: The PCEF/PDN GW sends a create IP-CAN session request message to a PCRF, where the create IP-CAN session request message carries the IMSI and the IMEI.

Step 7: The PCRF determines, through the IMEI, whether the UE belongs to the MTC UE Category; if yes, and the PCRF does not store subscription information of the UE, the PCRF sends a subscription information request message to an SPR, where the subscription information request message carries the IMSI and the IMEI.

Step 8: The SPR device searches for the corresponding subscription information of the category to which the UE belongs by using the IMEI as an index, where the subscription information of the category to which the UE belongs includes service information applicable to the MTC UE Category, and the SPR device searches for the corresponding subscription information of the subscriber of the UE by using the IMSI as an index; replaces the service information in the subscription information of the subscriber of the UE with the service information in the subscription information of the category to which the UE belongs; and sends a subscription information response message carrying the replaced subscription information of the subscriber of the UE to the PCRF.

Step 9: The PCRF implements a policy decision according to the replaced subscription information of the subscriber of the UE, and generates a PCC rule of the subscriber of the UE.

Step 10: The PCRF sends a create IP-CAN session response message to a PCEF/PDN GW, where the create IP-CAN session response message carries the PCC rule of the subscriber of the UE.

Step 11: The PCEF/PDN GW sends a create session response message to the Serving GW.

Step 12: The Serving GW sends the create session response message to the MME.

Step 13: The MME sends an attach accept message to the UE.

When the UE is powered on, the above initial attachment process is triggered to establish a connection to a network side; and the UE may further send a PDN connection establishment request message to the MME to establish a new PDN connection.

Figure 7A:
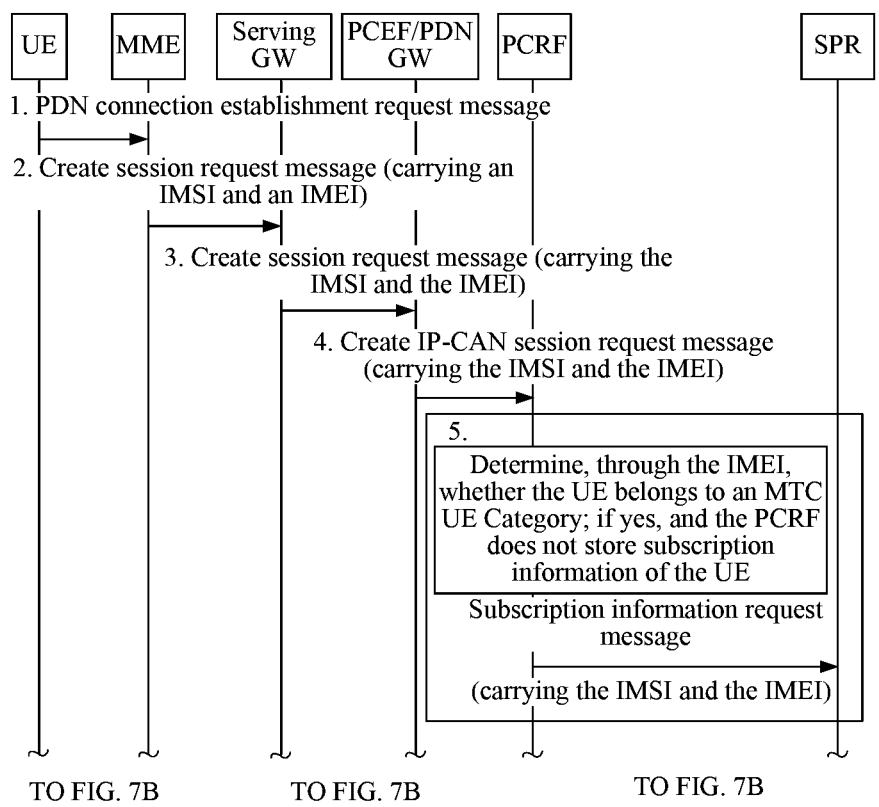
FIG. 7A and FIG. 7B are a signaling diagram of a sixth session processing method of machine type communication according to an embodiment of the present disclosure.
Figure 7B:
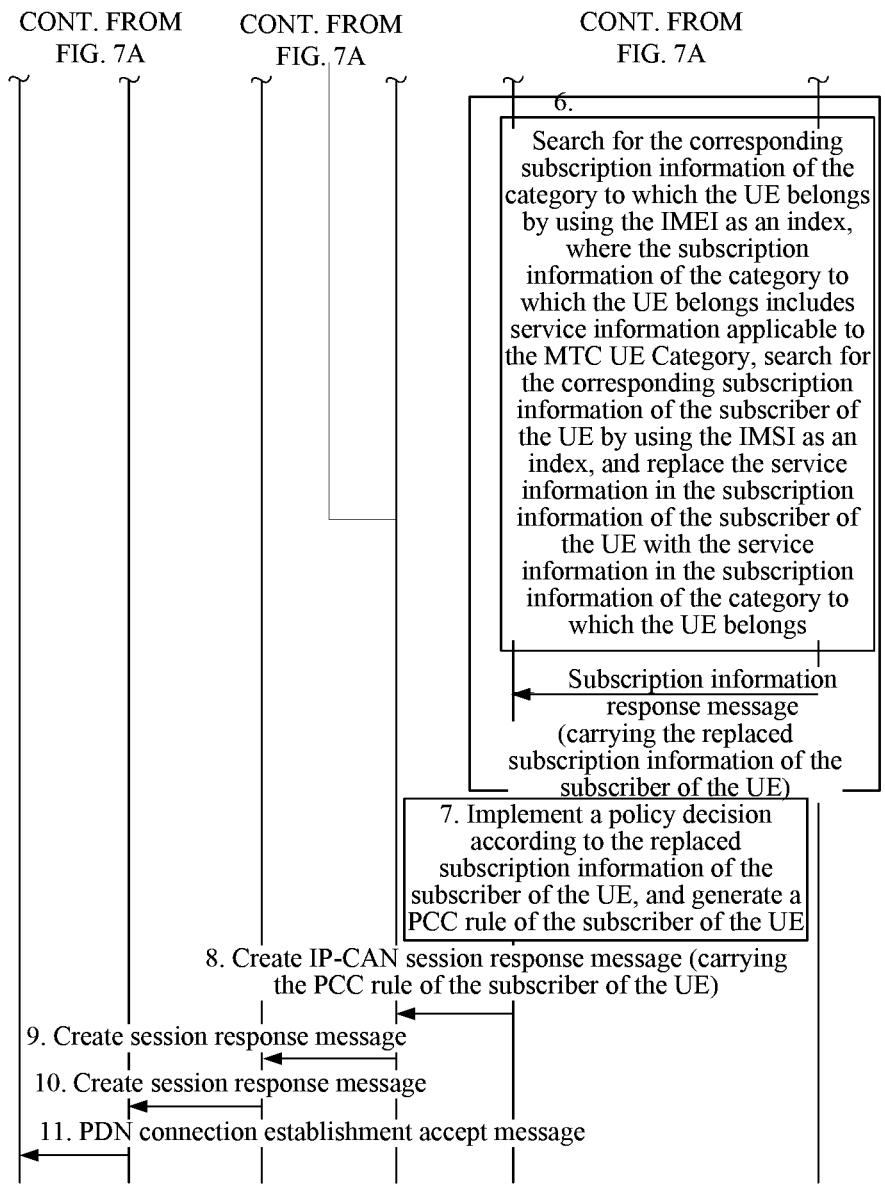

FIG. 7A and FIG. 7B are a signaling diagram of a sixth session processing method of machine type communication according to an embodiment of the present disclosure. As shown in FIG. 7A and FIG. 7B, this session processing procedure of machine type communication includes:

Step 1: A UE sends a PDN connection establishment request message to an MME.

Step 2: The MME sends a create session request message to a Serving GW, where the create session request message carries an IMSI and an IMEI, and the IMEI may indicate that the UE belongs to an MTC UE Category.

Step 3: The Serving GW forwards the create session request message to a PCEF/PDN GW.

Step 4: The PCEF/PDN GW sends a create IP-CAN session request message to a PCRF, where the create IP-CAN session request message carries the IMSI and the IMEI.

Step 5: The PCRF determines, through the IMEI, whether the UE belongs to the MTC UE Category; if yes, and the PCRF does not store subscription information of the UE, the PCRF sends a subscription information request message to an SPR, where the subscription information request message carries the IMSI and the IMEI.

Step 6: The SPR device searches for the corresponding subscription information of the category to which the UE belongs by using the IMEI as an index, where the subscription information of the category to which the UE belongs includes service information applicable to the MTC UE Category, and the SPR device searches for the corresponding subscription information of the subscriber of the UE by using the IMSI as an index; replaces the service information in the subscription information of the subscriber of the UE with the service information in the subscription information of the category to which the UE belongs; and sends a subscription information response message carrying the replaced subscription information of the subscriber of the UE to the PCRF.

Step 7: The PCRF implements a policy decision according to the replaced subscription information of the subscriber of the UE, and generates a PCC rule of the subscriber of the UE.

Step 8: The PCRF sends a create IP-CAN session response message to a PCEF/PDN GW, where the create IP-CAN session response message carries the PCC rule of the subscriber of the UE.

Step 9: The PCEF/PDN GW sends a create session response message to the Serving GW.

Step 10: The Serving GW sends the create session response message to the MME.

Step 11: The MME sends a PDN connection establishment accept message to the UE.

Figure 8A:
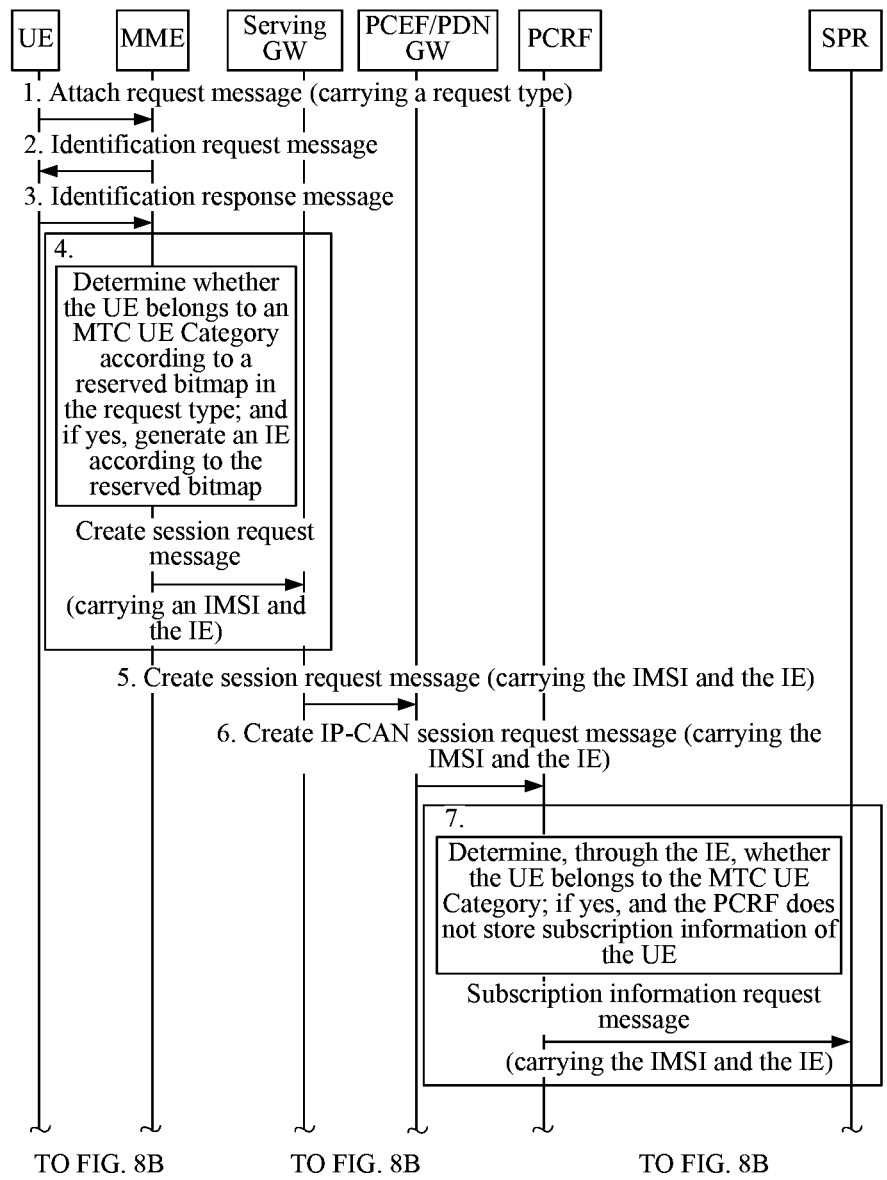
FIG. 8A and FIG. 8B are a signaling diagram of a seventh session processing method of machine type communication according to an embodiment of the present disclosure.
Figure 8B:
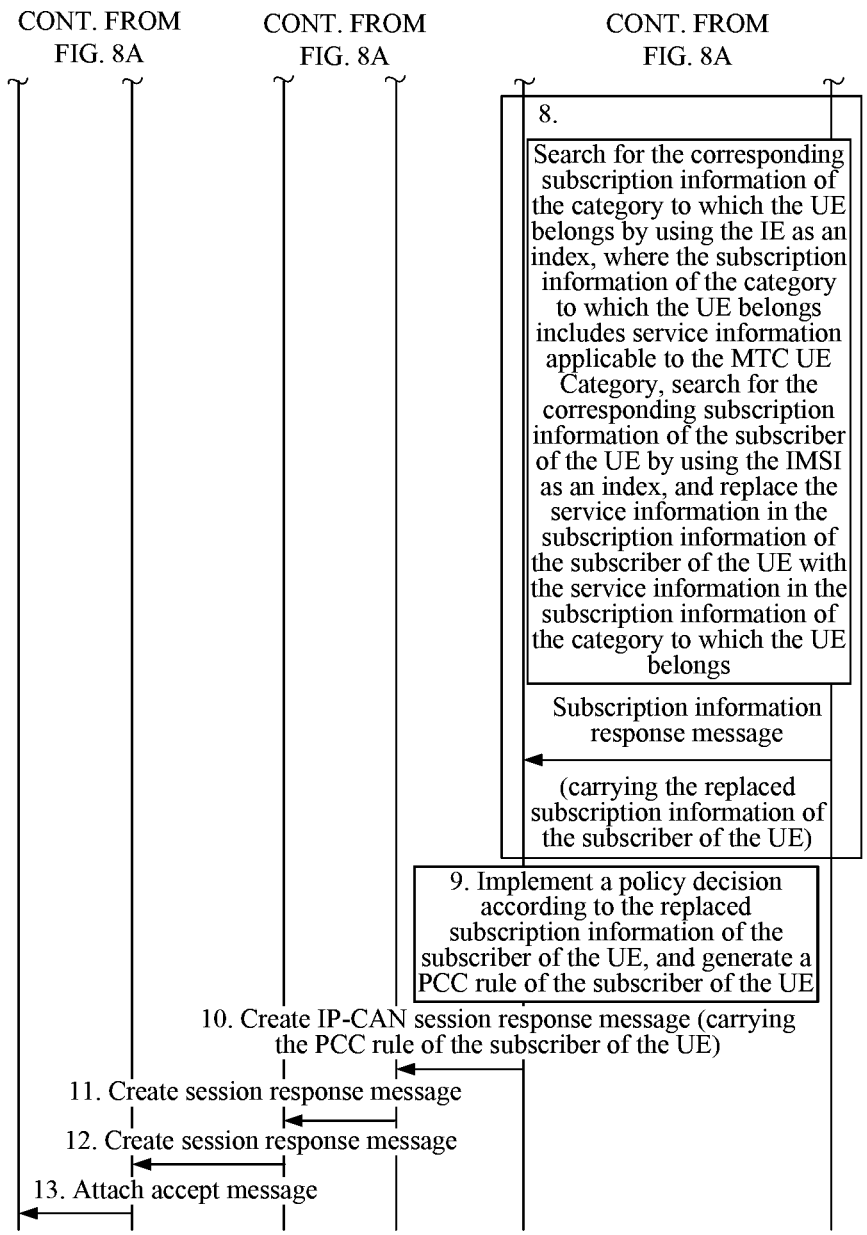

FIG. 8A and FIG. 8B are a signaling diagram of a seventh session processing method of machine type communication according to an embodiment of the present disclosure. As shown in FIG. 8A and FIG. 8B, subscription information of a category to which a UE belongs and subscription information of a subscriber of the UE are stored in an SPR device, the subscription information of the category to which the UE belongs includes service information applicable to an MTC UE Category, the service information may include information such as a service type, and a device parameter is an IE. This session processing procedure of machine type communication includes:

Step 1: A UE sends an attach request message to an MME, where the attach request message carries a request type, the request type includes a reserved bitmap, and the reserved bitmap in the request type may indicate that the UE belongs to an MTC UE Category.

Step 2: The MME sends an identification request message to the UE.

Step 3: The UE sends an identification response message to the MME, where the identification response message may carry information used to generate an IMSI.

Step 4: The MME determines, according to the reserved bitmap in the request type, whether the UE belongs to the MTC UE Category; and if yes, generates an IE according to the reserved bitmap, and sends a create session request message to a Serving GW, where the create session request message carries an IMSI and the IE, and the IMSI may be generated by the MME according to the information which is used to generate the IMSI and is in the received identification response message or may be acquired according to the identification response message.

Step 5: The Serving GW forwards the create session request message to a PCEF/PDN GW.

Step 6: The PCEF/PDN GW sends a create IP-CAN session request message to a PCRF, where the create IP-CAN session request message carries the IMSI and the IE.

Step 7: The PCRF determines, through the IE, whether the UE belongs to the MTC UE Category; if yes, and the PCRF does not store subscription information of the UE, the PCRF sends a subscription information request message to an SPR, where the subscription information request message carries the IMSI and the IE.

Step 8: The SPR device searches for the corresponding subscription information of the category to which the UE belongs by using the IE as an index, where the subscription information of the category to which the UE belongs includes service information applicable to the MTC UE Category, and the SPR device searches for the corresponding subscription information of the subscriber of the UE by using the IMSI as an index; replaces the service information in the subscription information of the subscriber of the UE with the service information in the subscription information of the category to which the UE belongs; and sends a subscription information response message carrying the replaced subscription information of the subscriber of the UE to the PCRF.

Step 9: The PCRF implements a policy decision according to the replaced subscription information of the subscriber of the UE, and generates a PCC rule of the subscriber of the UE.

Step 10: The PCRF sends a create IP-CAN session response message to a PCEF/PDN GW, where the create IP-CAN session response message carries the PCC rule of the subscriber of the UE.

Step 11: The PCEF/PDN GW sends a create session response message to the Serving GW.

Step 12: The Serving GW sends the create session response message to the MME.

Step 13: The MME sends an attach accept message to the UE.

When the UE is powered on, the above initial attachment process is triggered to establish a connection to a network side; and the UE may further send a PDN connection establishment request message to the MME to establish a new PDN connection.

Figure 9A:
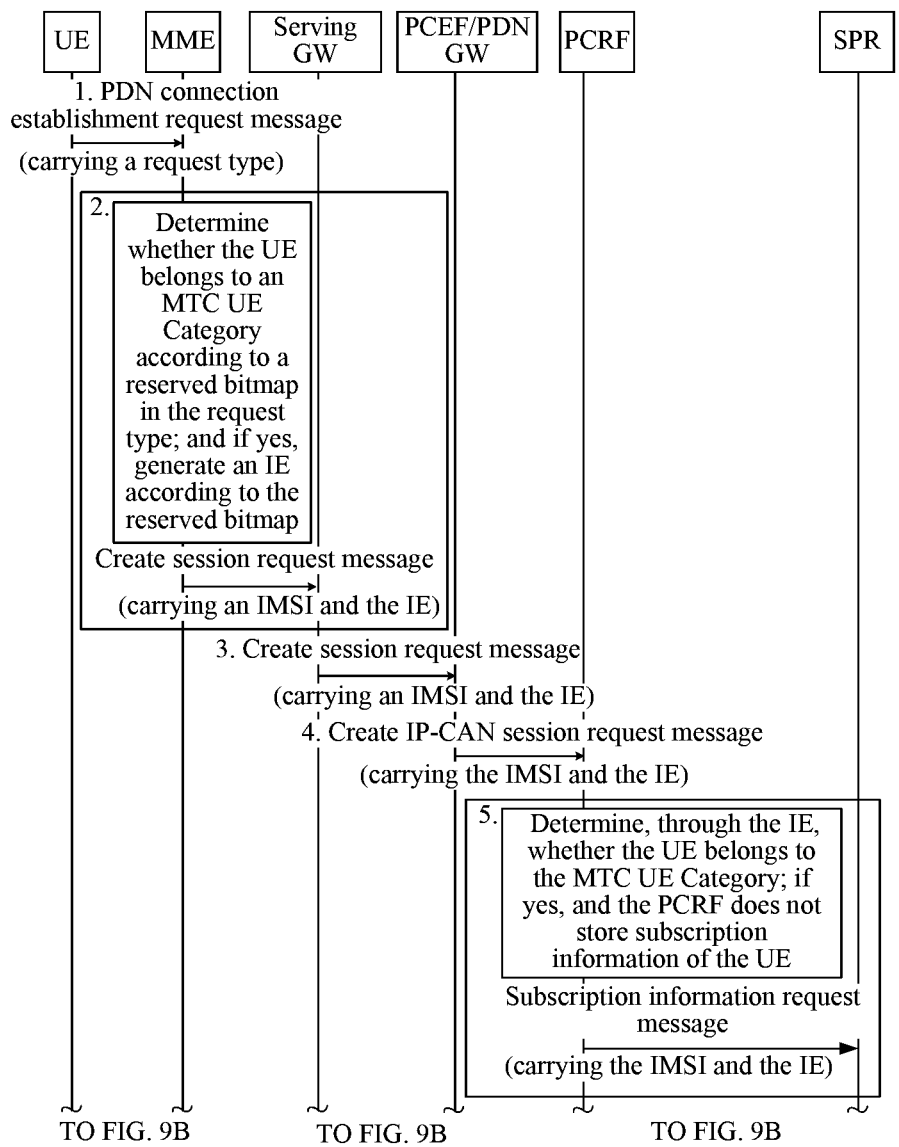
FIG. 9A and FIG. 9B are a signaling diagram of an eighth session processing method of machine type communication according to an embodiment of the present disclosure.
Figure 9B:
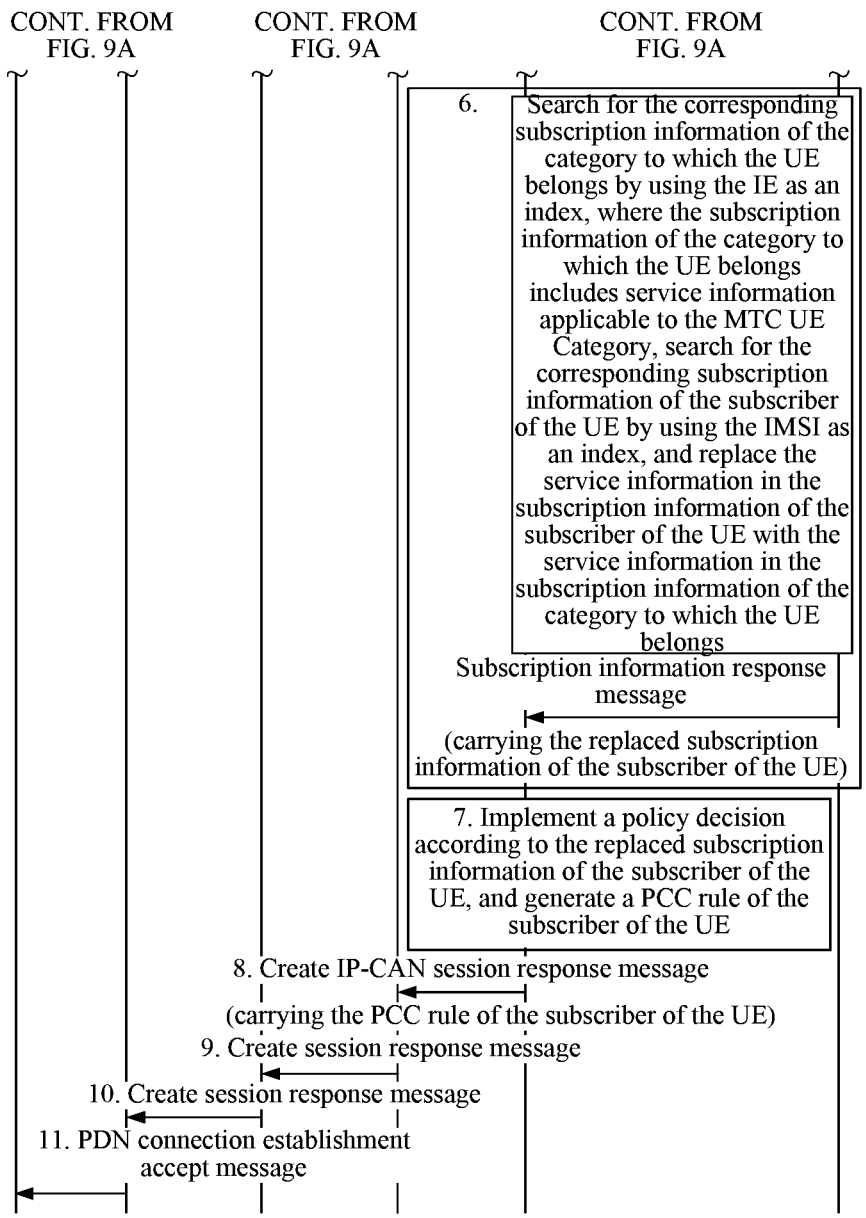

FIG. 9A and FIG. 9B are a signaling diagram of an eighth session processing method of machine type communication according to an embodiment of the present disclosure. As shown in FIG. 9A and FIG. 9B, this session processing procedure of machine type communication includes:

Step 1: A UE sends a PDN connection establishment request message to an MME, where the PDN connection establishment request message carries a request type, the request type includes a reserved bitmap, and the reserved bitmap in the request type may indicate that the UE belongs to an MTC UE Category.

Step 2: The MME determines, according to the reserved bitmap in the request type, whether the UE belongs to the MTC UE Category; and if yes, generates an IE according to the reserved bitmap, and sends a create session request message to a Serving GW, where the create session request message carries an IMSI and the IE.

Step 3: The Serving GW forwards the create session request message to a PCEF/PDN GW.

Step 4: The PCEF/PDN GW sends a create IP-CAN session request message to a PCRF, where the create IP-CAN session request message carries the IMSI and the IE.

Step 5: The PCRF determines, through the IE, whether the UE belongs to the MTC UE Category; if yes, and the PCRF does not store subscription information of the UE, the PCRF sends a subscription information request message to an SPR, where the subscription information request message carries the IMSI and the IE.

Step 6: The SPR device searches for the corresponding subscription information of the category to which the UE belongs by using the IE as an index, where the subscription information of the category to which the UE belongs includes service information applicable to the MTC UE Category, and the SPR device searches for the corresponding subscription information of the subscriber of the UE by using the IMSI as an index; replaces the service information in the subscription information of the subscriber of the UE with the service information in the subscription information of the category to which the UE belongs; and sends a subscription information response message carrying the replaced subscription information of the subscriber of the UE to the PCRF.

Step 7: The PCRF implements a policy decision according to the replaced subscription information of the subscriber of the UE, and generates a PCC rule of the subscriber of the UE.

Step 8: The PCRF sends a create IP-CAN session response message to a PCEF/PDN GW, where the create IP-CAN session response message carries the PCC rule of the subscriber of the UE.

Step 9: The PCEF/PDN GW sends a create session response message to the Serving GW.

Step 10: The Serving GW sends the create session response message to the MME.

Step 11: The MME sends a PDN connection establishment accept message to the UE.

Figure 10:
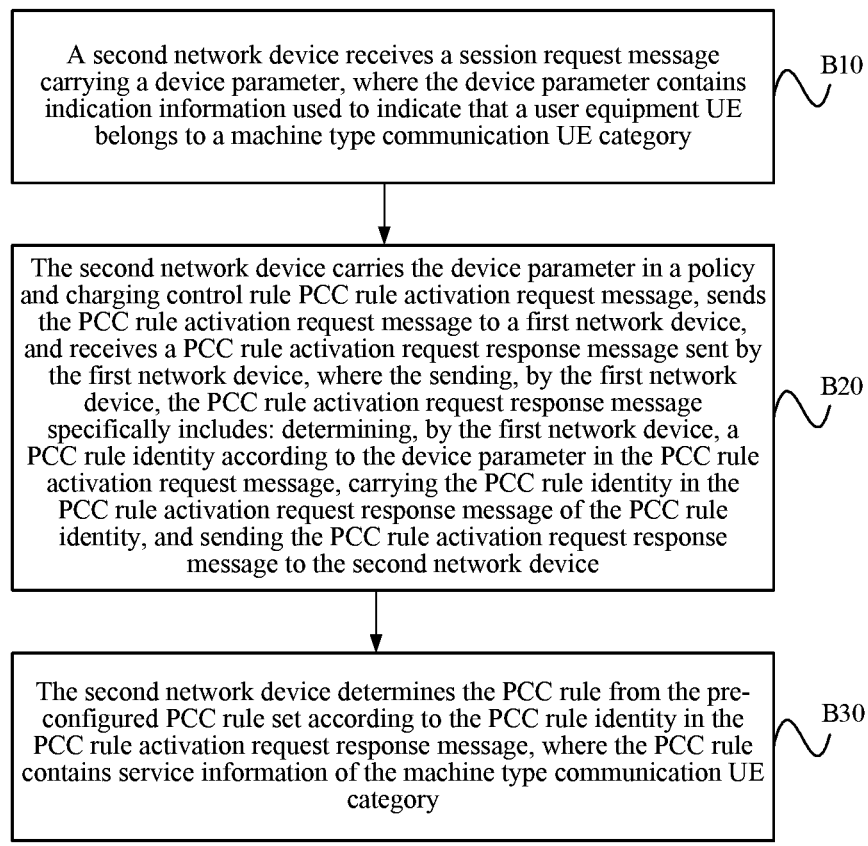
FIG. 10 is a flow chart of a second session processing method of machine type communication according to an embodiment of the present disclosure.

FIG. 10 is a flow chart of a second session processing method of machine type communication according to an embodiment of the present disclosure. As shown in FIG. 10, the session processing method of machine type communication according to this embodiment may be applied in a session processing procedure of a UE belonging to an MTC UE category (category) in a communication system. The MTC UE category may indicate that the UE is a low cost (Low cost) MTC UE. The UE may be an Internet of Things terminal applied in a smart meter reading service, a monitoring service, and a telemedicine service and the like, and may also be other low cost mobile terminals. The communication system may be an LTE communication system, and the LTE communication system may include a packet data network gateway (Packet Data Network Gateway, PDN GW for short), a serving gateway (Serving Gateway, Serving GW for short), a mobility management entity (Mobility Management Entity, MME for short), a policy and charging enforcement function (Policy and Charging Enforcement Function, PCEF for short) entity, and a policy and charging rules function (Policy and Charging Rules Function, PCRF for short) entity and the like.

The session processing method of machine type communication according to this embodiment includes:

Step B10: A second network device receives a session request message carrying a device parameter, where the device parameter includes indication information used to indicate that a user equipment UE belongs to a machine type communication UE category.

In some embodiments, in an LTE communication system, a PCEF or a PDN GW may be used as the second network device; and, in other communication systems, a network element with a similar function may be used as the second network device.

The second network device receives a session request message, where the session request message may be a create session request message, and the create session request message is sent by a Serving GW and may be generated as triggered by an attach request message or a packet switched network PDN connection establishment request message sent by the UE to a network side. The create session request message carries a device parameter, where the device parameter is used to indicate the UE, that is, each UE has a unique device parameter. When the UE belongs to an MTC UE category of Low cost MTC UEs, the device parameter includes indication information used to indicate that the UE belongs to the MTC UE category, where the indication information may be a field.

In an actual application, the device parameter may be implemented by using existing information used to identify a device, for example, the device parameter may be an international mobile equipment identity (International Mobile Equipment Identity, IMEI for short), where the IMEI may include the following fields:

<TAC><SNR><CD/SD> where:

TAC: 8 bits, type allocation code, which is a code for differentiating a brand and a model of a UE, and is allocated by the global system for mobile communications assembly (Global System for Mobile Communications assembly, GSMA for short) and its authorized body;

SNR: 6 bits, serial number, used to differentiate a production serial number of each UE; and CD/SD: 1 bit, verification code, obtained through the Luhn (mod 10) algorithm by using the first 14 digits.

A field in the IMEI may be preset to indicate that the UE belongs to the MTC UE category.

The device parameter may also be redefined indication information, for example, an attach request message sent by the UE to the MME may carry a request type, a reserved bitmap of the request type may indicate that the UE belongs to the MTC UE category, and the MME may generate information element (Information Element, IE for short) according to the reserved bitmap (bitmap) in the request type, where the IE is the device parameter.

In some embodiments, the device parameter may also be implemented in other forms, as long as the purpose for indicating that the UE belongs to the MTC UE category is achieved, which is not limited by this embodiment.

The create session request message may also carry information such as an IMSI and an APN.

Step B20: The second network device carries the device parameter in a policy and charging control rule PCC rule activation request message, sends the policy and charging control rule PCC rule activation request message to a first network device, and receives a PCC rule activation request response message sent by the first network device, where sending, by the first network device, the PCC rule activation request response message is:

determining, by the first network device, a PCC rule identity according to the device parameter in the PCC rule activation request message, carrying the PCC rule identity in the PCC rule activation request response message of the PCC rule identity, and sending the PCC rule activation request response message to the second network device, where a PCC rule set is pre-configured in the second network device, the PCC rule set includes multiple PCC rules applicable to the MTC UE category, each PCC rule includes service information of the machine type communication UE category, and the service information may include information such as a service type. The second network device carries the device parameter in the PCC rule activation request message and sends the PCC rule activation request message to the first network device. In the LTE communication system, the PCRF may be used as the first network device, and of course, in other communication systems, a network element with a similar function may be used as the first network device. The first network device determines a PCC rule identity (Identity, ID for short) according to the device parameter, that is, selects a PCC rule applicable to the MTC UE category, carries the PCC rule ID in the PCC rule activation request response message, and sends the PCC rule activation request response message to the second network device.

Step B30: The second network device determines the PCC rule from the pre-configured PCC rule set according to the PCC rule identity in the PCC rule activation request response message, where the PCC rule includes service information of the machine type communication UE category.

The second network device determines a PCC rule from the pre-configured PCC rule set according to the PCC rule ID, and may perform corresponding policy and charging processing according to the PCC rule.

In the session processing method of machine type communication according to this embodiment, the second network device receives a session request message carrying a device parameter, where the device parameter includes indication information used to indicate that a user equipment UE belongs to a machine type communication UE category, carries the device parameter in a policy and charging control rule PCC rule activation request message and sends the policy and charging control rule PCC rule activation request message to the first network device, receives a PCC rule activation request response message sent by the first network device, and determines a PCC rule from a pre-configured PCC rule set according to a PCC rule identity in the PCC rule activation request response message, where the PCC rule includes service information of the machine type communication UE category. The session request message carries the device parameter, the device parameter is used to indicate the user equipment UE, the device parameter includes the indication information used to indicate that the UE belongs to the machine type communication UE category, and the PCC rule includes the service information of the machine type communication UE category; therefore, explicit binding of the MTC UE Category to a Low cost MTC service is implemented, so that a Low cost MTC UE adopting the MTC UE Category can merely use a specified MTC service, and a non-Low cost MTC UE cannot use the above specified MTC service. In this way, it is ensured that the cost reduction technology does not affect the performance of a UE that belongs to an existing UE Category, thereby improving network performance of a communication system.

Preferably, in this embodiment, the device parameter is an international mobile equipment identity or an information element.

In this embodiment, the session request message is generated as triggered by an attach request message or a packet switched network PDN connection establishment request message sent by the UE to the mobility management entity.

In some embodiments, after the UE is powered on, an initial attachment process is triggered, the UE sends an attach request message to the MME at the network side to establish a connection to the network side, and the UE may further send a PDN connection establishment request message to the MME to establish a new PDN connection.

In this embodiment, the device parameter is an international mobile equipment identity, and the international mobile equipment identity in the session request message is sent by the UE to the second network device through the mobility management entity and the serving gateway.

In this embodiment, the device parameter is an information element; the information element in the session request message is generated by the mobility management entity according to a reserved bitmap of a request type carried in the attach request message sent by the UE, and is sent to the second network device through the serving gateway; and the reserved bitmap of the request type carried in the attach request message indicates that the UE belongs to the machine type communication UE category.

In the actual application, the device parameter and a triggering process of the session request message may be implemented in various manners; and the session processing method of machine type communication according to this embodiment is described in detail through examples of different application scenarios in the LTE communication system.

Figure 11:
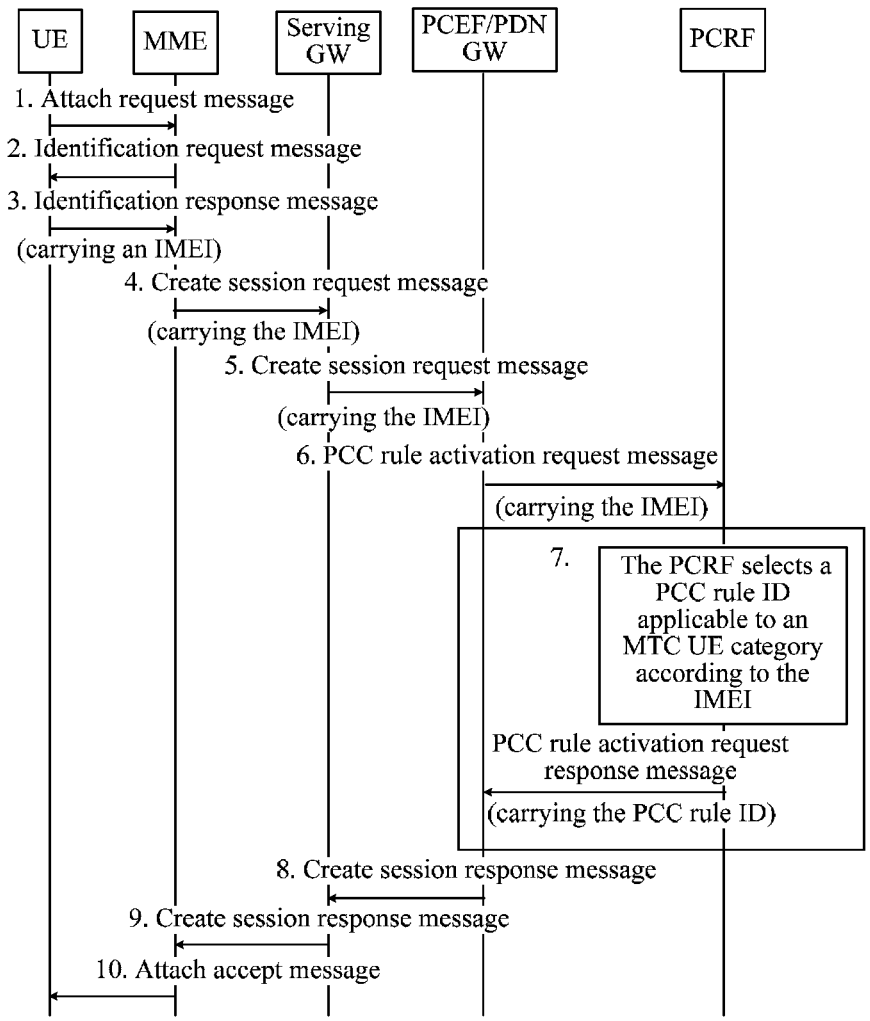
FIG. 11 is a signaling diagram of a ninth session processing method of machine type communication according to an embodiment of the present disclosure.

FIG. 11 is a signaling diagram of a ninth session processing method of machine type communication according to an embodiment of the present disclosure. As shown in FIG. 11, a device parameter is an IMEI, and this session processing procedure of machine type communication includes:

Step 1: A UE sends an attach request message to an MME.

Step 2: The MME sends an identification request message to the UE.

Step 3: The UE sends an identification response message to the MME, where the identification response message carries an IMEI, and the IMEI may indicate that the UE belongs to an MTC UE Category.

Step 4: The MME sends a create session request message to a Serving GW, where the create session request message carries the IMEI.

Step 5: The Serving GW forwards the create session request message to a PCEF/PDN GW.

Step 6: The PCEF/PDN GW sends a PCC rule activation request message to a PCRF, where the PCC rule activation request message carries the IMEI.

Step 7: The PCRF selects a PCC rule ID applicable to the MTC UE category according to the IMEI, carries the PCC rule ID in a PCC rule activation request response message, and sends the PCC rule activation request response message to the PCEF/PDN GW.

Step 8: The PCEF/PDN GW sends a create session response message to the Serving GW.

Step 9: The Serving GW sends the create session response message to the MME.

Step 10: The MME sends an attach accept message to the UE.

When the UE is powered on, the above initial attachment process is triggered to establish a connection to a network side; and the UE may further send a PDN connection establishment request message to the MME to establish a new PDN connection.

Figure 12:
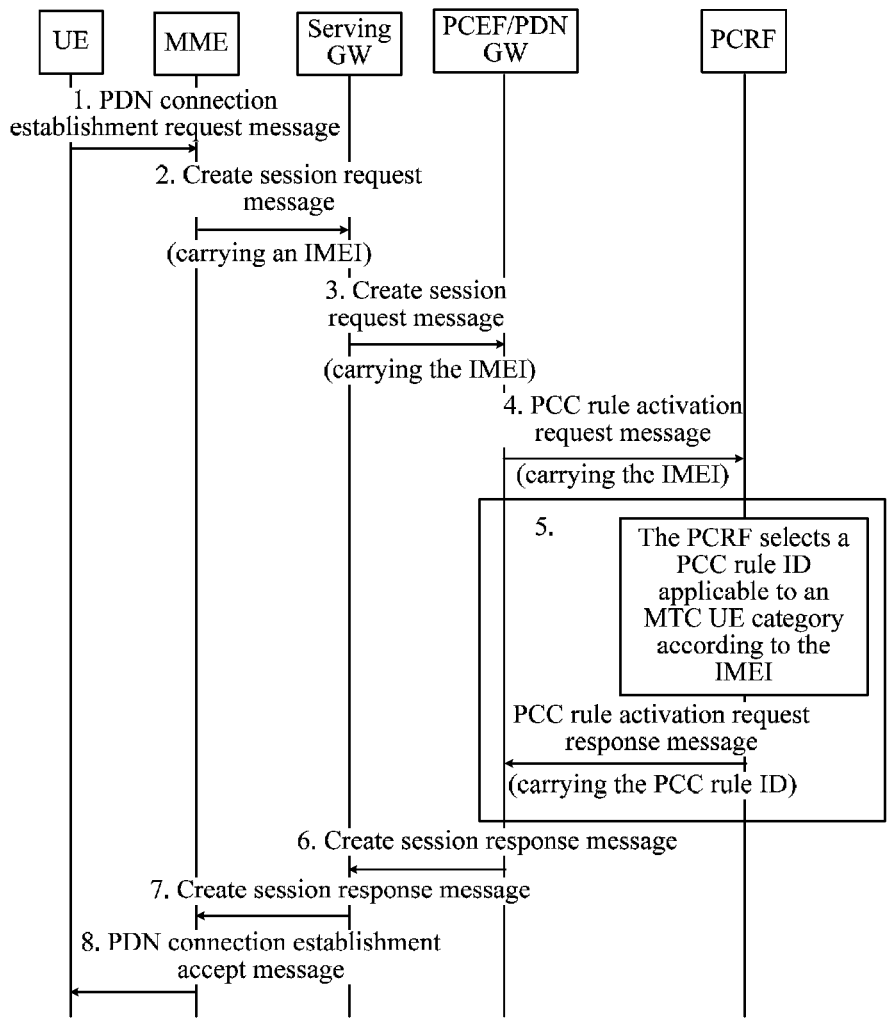
FIG. 12 is a signaling diagram of a tenth session processing method of machine type communication according to an embodiment of the present disclosure.

FIG. 12 is a signaling diagram of a tenth session processing method of machine type communication according to an embodiment of the present disclosure. As shown in FIG. 12, this session processing procedure of machine type communication includes:

Step 1: A UE sends a PDN connection establishment request message to an MME.

Step 2: The MME sends a create session request message to a Serving GW, where the create session request message carries an IMEI, and the IMEI may indicate that the UE belongs to an MTC UE Category.

Step 3: The Serving GW forwards the create session request message to a PCEF/PDN GW.

Step 4: The PCEF/PDN GW sends a PCC rule activation request message to a PCRF, where the PCC rule activation request message carries the IMEI.

Step 5: The PCRF selects a PCC rule ID applicable to the MTC UE category according to the IMEI, carries the PCC rule ID in a PCC rule activation request response message, and sends the PCC rule activation request response message to the PCEF/PDN GW.

Step 6: The PCEF/PDN GW sends a create session response message to the Serving GW.

Step 7: The Serving GW sends the create session response message to the MME.

Step 8: The MME sends a PDN connection establishment accept message to the UE.

Figure 13:
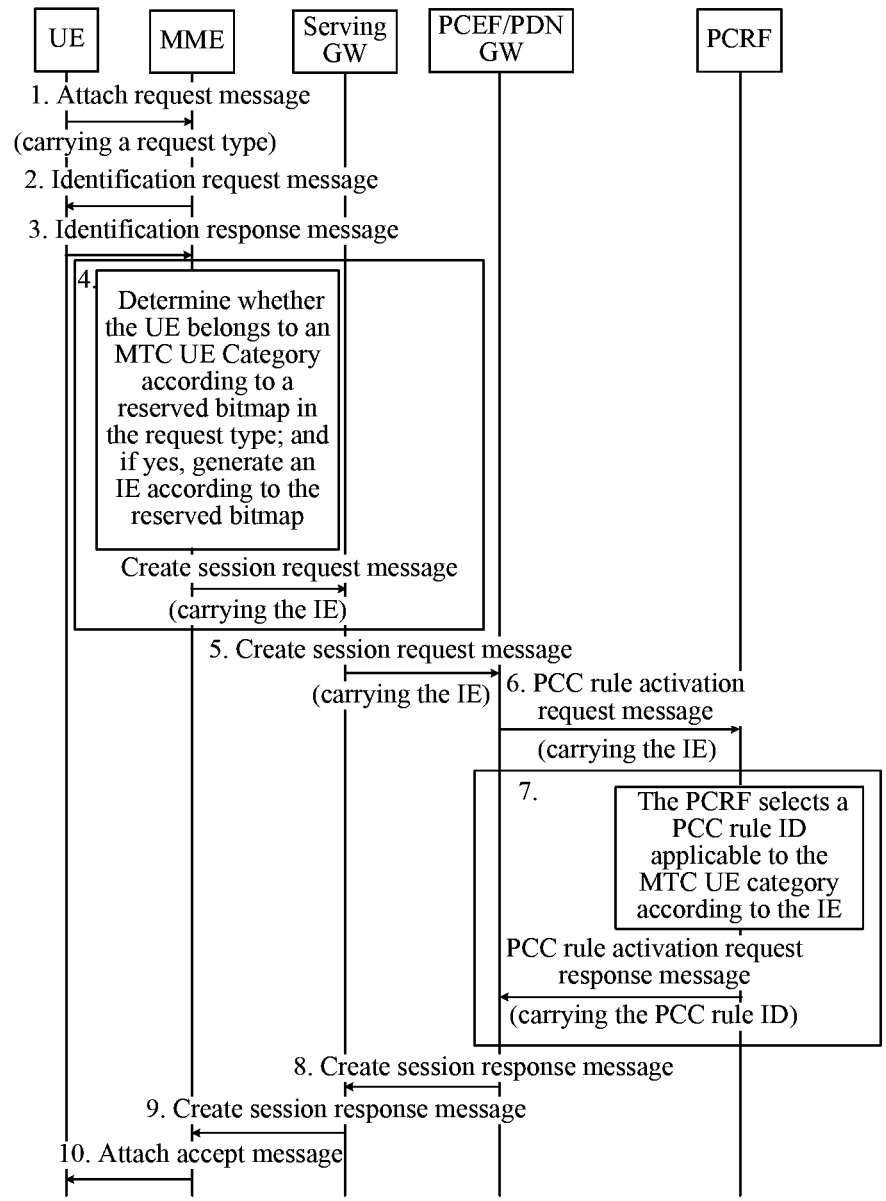
FIG. 13 is a signaling diagram of an eleventh session processing method of machine type communication according to an embodiment of the present disclosure.

FIG. 13 is a signaling diagram of an eleventh session processing method of machine type communication according to an embodiment of the present disclosure. As shown in FIG. 13, a device parameter is an IE, and this session processing procedure of machine type communication includes:

Step 1: A UE sends an attach request message to an MME, where the attach request message carries a request type, the request type includes a reserved bitmap, and the reserved bitmap in the request type may indicate that the UE belongs to an MTC UE Category.

Step 2: The MME sends an identification request message to the UE.

Step 3: The UE sends an identification response message to the MME.

Step 4: The MME determines, according to the reserved bitmap in the request type, whether the UE belongs to the MTC UE Category; and if yes, generates an IE according to the reserved bitmap, and sends a create session request message to a Serving GW, where the create session request message carries the IE.

Step 5: The Serving GW forwards the create session request message to a PCEF/PDN GW.

Step 6: The PCEF/PDN GW sends a PCC rule activation request message to a PCRF, where the PCC rule activation request message carries the IE.

Step 7: The PCRF selects a PCC rule ID applicable to the MTC UE category according to the IE, carries the PCC rule ID in a PCC rule activation request response message, and sends the PCC rule activation request response message to the PCEF/PDN GW.

Step 8: The PCEF/PDN GW sends a create session response message to the Serving GW.

Step 9: The Serving GW sends the create session response message to the MME.

Step 10: The MME sends an attach accept message to the UE.

When the UE is powered on, the above initial attachment process is triggered to establish a connection to a network side; and the UE may further send a PDN connection establishment request message to the MME to establish a new PDN connection.

Figure 14:
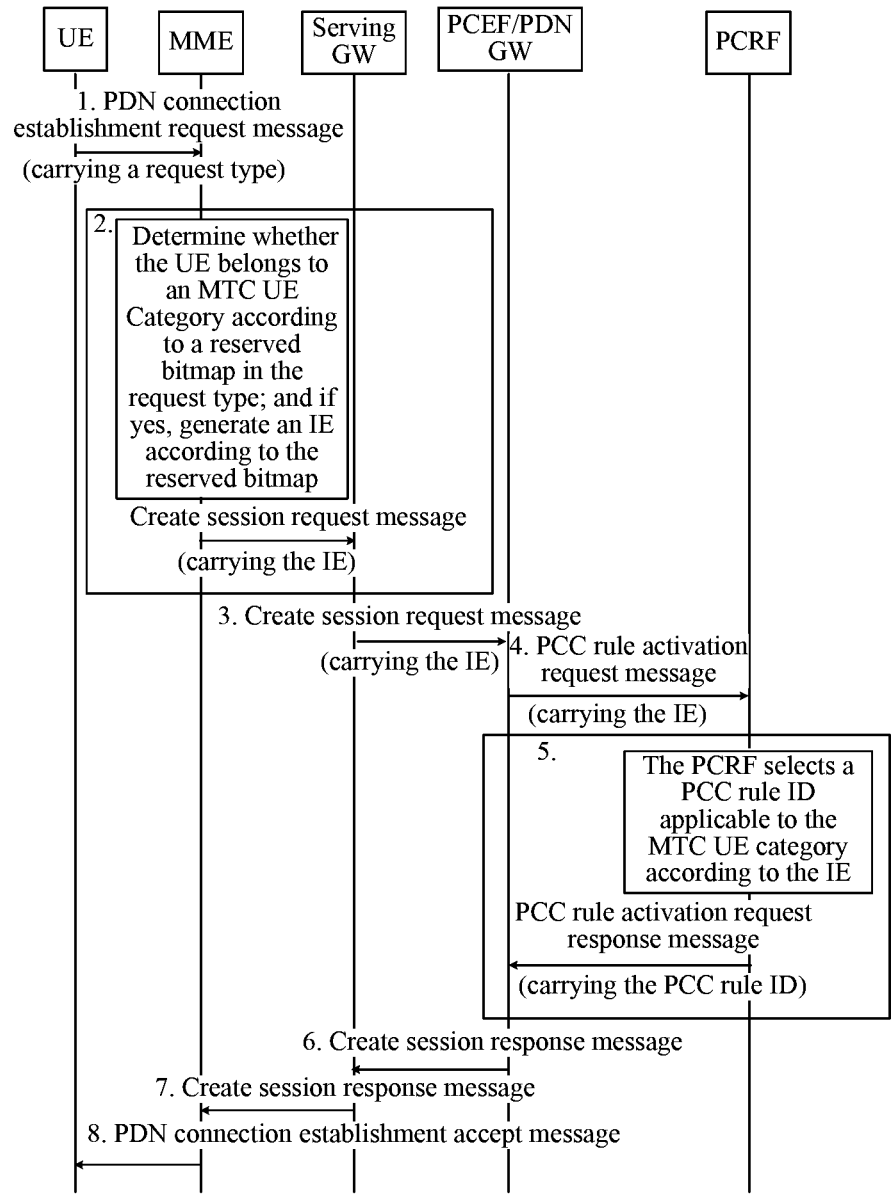
FIG. 14 is a signaling diagram of a twelfth session processing method of machine type communication according to an embodiment of the present disclosure.

FIG. 14 is a signaling diagram of a twelfth session processing method of machine type communication according to an embodiment of the present disclosure. As shown in FIG. 14, this session processing procedure of machine type communication includes:

Step 1: A UE sends a PDN connection establishment request message to an MME, where the PDN connection establishment request message carries a request type, the request type includes a reserved bitmap, and the reserved bitmap in the request type may indicate that the UE belongs to an MTC UE Category.

Step 2: The MME determines, according to the reserved bitmap in the request type, whether the UE belongs to the MTC UE Category; and if yes, generates an IE according to the reserved bitmap, and sends a create session request message to a Serving GW, where the create session request message carries the IE.

Step 3: The Serving GW forwards the create session request message to a PCEF/PDN GW.

Step 4: The PCEF/PDN GW sends a PCC rule activation request message to a PCRF, where the PCC rule activation request message carries the IE.

Step 5: The PCRF selects a PCC rule ID applicable to the MTC UE category according to the IE, carries the PCC rule ID in a PCC rule activation request response message, and sends the PCC rule activation request response message to the PCEF/PDN GW.

Step 6: The PCEF/PDN GW sends a create session response message to the Serving GW.

Step 7: The Serving GW sends the create session response message to the MME.

Step 8: The MME sends a PDN connection establishment accept message to the UE.

Figure 15:
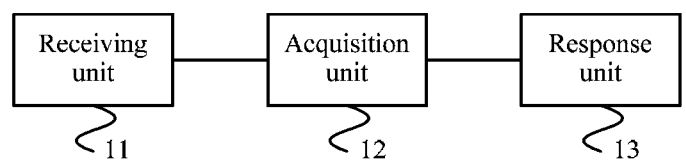
FIG. 15 is a schematic structural diagram of a network device according to an embodiment of the present disclosure.

FIG. 15 is a schematic structural diagram of a network device according to an embodiment of the present disclosure. As shown in FIG. 15, the network device according to this embodiment can implement the steps in the embodiment shown in FIG. 1, and the specific implementation process is not described in detail herein again. In an LTE communication system, the network device may be a PCRF; and of course, in other communication systems, a network element with a similar function may be used as the network device.

The network device according to this embodiment includes a receiving unit 11, an acquisition unit 12, and a response unit 13. The receiving unit 11 is configured to receive a session request message, where the session request message carries a device parameter, and the device parameter includes indication information used to indicate that a user equipment UE belongs to a machine type communication UE category. The acquisition unit 12 is configured to acquire subscription information according to the device parameter, where the subscription information includes service information corresponding to the machine type communication UE category. The response unit 13 is configured to generate a policy and charging control rule PCC rule of a subscriber of the UE according to the subscription information, carry the PCC rule in a session response message, and send the session response message, where the PCC rule includes the service information corresponding to the machine type communication UE category.

In the network device according to this embodiment, the receiving unit 11 receives a session request message, where the session request message carries a device parameter, and the device parameter includes indication information used to indicate that a user equipment UE belongs to a machine type communication UE category. The acquisition unit 12 acquires subscription information according to the device parameter, where the subscription information includes service information corresponding to the machine type communication UE category. The response unit 13 generates a policy and charging control rule PCC rule of a subscriber of the UE according to the subscription information, carries the PCC rule in a session response message, and sends the session response message, where the PCC rule includes the service information corresponding to the machine type communication UE category. The session request message carries the device parameter, the device parameter is used to indicate the UE, the device parameter includes the indication information used to indicate that the UE belongs to the machine type communication UE category, the subscription information includes the service information of the machine type communication UE category, and the PCC rule includes the service information of the machine type communication UE category; therefore, explicit binding of the MTC UE Category to a Low cost MTC service is implemented, so that a Low cost MTC UE adopting the MTC UE Category can merely use a specified MTC service, and a non-Low cost MTC UE cannot use the above specified MTC service. In this way, it is ensured that the above cost reduction technology does not affect the performance of a UE that belongs to an existing UE Category, thereby improving network performance of a communication system.

In this embodiment, the acquisition unit 12 is further configured to send, to a subscription profile repository (SPR) device, a subscription information request message carrying the device parameter, and receive the subscription information of the UE that is returned by the SPR device and acquired according to the device parameter in the subscription information request message. The session request message further carries an international mobile subscriber identity used to indicate the subscriber of the UE. The response unit 13 is further configured to generate the PCC rule of the UE according to the received subscription information of the UE, and apply the PCC rule of the UE in the subscriber of the UE according to the international mobile subscriber identity.

In this embodiment, the acquisition unit 12 is further configured to send, to the subscription profile repository SPR device, a subscription information request message that carries the international mobile subscriber identity used to indicate the subscriber of the UE and carries the device parameter, and receive subscription information of the subscriber of the UE that is returned by the SPR device, where returning, by the SPR device, the subscription information of the subscriber of the UE is: acquiring, by the SPR device, subscription information of a category to which the UE belongs according to the device parameter in the subscription information request message, acquiring subscription information of the subscriber of the UE according to the international mobile subscriber identity in the subscription information request message, replacing service information in the subscription information of the subscriber of the UE with service information in the subscription information of the category to which the UE belongs, and sending the replaced subscription information of the subscriber of the UE to the response unit. The response unit 13 is further configured to generate the PCC rule of the subscriber of the UE according to the received replaced subscription information of the subscriber of the UE.

In this embodiment, the device parameter is an international mobile equipment identity or an information element.

In this embodiment, the session request message is generated as triggered by an attach request message or a packet switched network PDN connection establishment request message sent by the UE to a mobility management entity.

In this embodiment, the device parameter is an international mobile equipment identity; an international mobile subscriber identity in the session request message is sent by the mobility management entity to the receiving unit 11 of the first network device through a serving gateway and a second network device; and the international mobile equipment identity in the session request message is sent by the UE to the receiving unit 11 of the network device through the mobility management entity, the serving gateway, and the second network device.

In this embodiment, the device parameter is an information element; the international mobile subscriber identity in the session request message is sent by the mobility management entity to the receiving unit 11 of the network device through the serving gateway and the second network device; the information element in the session request message is generated by the mobility management entity according to a reserved bitmap of a request type carried in the attach request message sent by the UE, and is sent to the receiving unit 11 of the network device through the serving gateway and the second network device; and the reserved bitmap of the request type carried in the attach request message indicates that the UE belongs to the machine type communication UE category.

Figure 16:
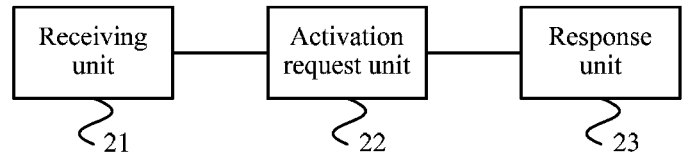
FIG. 16 is a schematic structural diagram of another network device according to an embodiment of the present disclosure.

FIG. 16 is a schematic structural diagram of another network device according to an embodiment of the present disclosure. As shown in FIG. 16, the network device according to this embodiment can implement the steps in the embodiment shown in FIG. 10, and the specific implementation process is not described in detail herein again. In an LTE communication system, the network device may be a PCEF or a PDN GW; and of course, in other communication systems, a network element with a similar function may be used as the network device.

The network device according to this embodiment includes a receiving unit 21, an activation request unit 22, and a response unit 23. The receiving unit 21 is configured to receive a session request message carrying a device parameter, where the device parameter includes indication information used to indicate that a user equipment UE belongs to a machine type communication UE category. The activation request unit 22 is configured to carry the device parameter in a policy and charging control rule PCC rule activation request message, send the policy and charging control rule PCC rule activation request message to a first network device, and receive a PCC rule activation request response message sent by the first network device, where sending, by the first network device, the PCC rule activation request response message includes: determining, by the first network device, a PCC rule identity according to the device parameter in the PCC rule activation request message, carrying the PCC rule identity in the PCC rule activation request response message of the PCC rule identity, and sending the PCC rule activation request response message. The response unit 23 is configured to determine the PCC rule from a pre-configured PCC rule set according to the PCC rule identity in the PCC rule activation request response message, where the PCC rule includes service information of the machine type communication UE category.

In the network device according to this embodiment, the receiving unit 21 receives a session request message carrying a device parameter, where the device parameter includes indication information used to indicate that a user equipment UE belongs to a machine type communication UE category. The activation request unit 22 carries the device parameter in a policy and charging control rule PCC rule activation request message, sends the PCC rule activation request message to a first network device, and receives a PCC rule activation request response message sent by the first network device. The response unit 23 determines a PCC rule from the pre-configured PCC rule set according to the PCC rule identity in the PCC rule activation request response message, where the PCC rule includes service information of the machine type communication UE category. The session request message carries the device parameter, the device parameter is used to indicate the user equipment UE, the device parameter includes the indication information used to indicate that the UE belongs to the machine type communication UE category, and the PCC rule includes the service information of the machine type communication UE category; therefore, explicit binding of the MTC UE Category to a Low cost MTC service is implemented, so that a Low cost MTC UE adopting the MTC UE Category can merely use a specified MTC service, and a non-Low cost MTC UE cannot use the above specified MTC service. In this way, it is ensured that the above cost reduction technology does not affect the performance of a UE that belongs to an existing UE Category, thereby improving network performance of a communication system.

In this embodiment, the device parameter is an international mobile equipment identity or an information element.

In this embodiment, the create session request message is generated as triggered by an attach request message or a packet switched network PDN connection establishment request message sent by the UE to a mobility management entity.

In this embodiment, the device parameter is an international mobile equipment identity, and the international mobile equipment identity in the session request message is sent by the UE to the receiving unit 21 of the network device through the mobility management entity and the serving gateway.

In this embodiment, the device parameter is an information element; the information element in the session request message is generated by the mobility management entity according to a reserved bitmap of a request type carried in the attach request message sent by the UE, and is sent to the receiving unit 21 of the network device through the serving gateway; and the reserved bitmap of the request type carried in the attach request message indicates that the UE belongs to the machine type communication UE category.

Persons of ordinary skill in the art should understand that all or a part of the steps of the method according to the embodiments of the present disclosure may be implemented by a program instructing relevant hardware. The program may be stored in a computer readable storage medium. When the program is run, the steps of the method according to the embodiments of the present disclosure are performed. The storage medium may be any medium that is capable of storing program codes, such as a ROM, a RAM, a magnetic disk or an optical disk.

Finally, it should be noted that, the above embodiments are merely provided for describing the technical solutions of the present disclosure, but not intended to limit the present disclosure. It should be understood by persons of ordinary skill in the art that although the present disclosure has been described in detail with reference to the embodiments, modifications can be made to the technical solutions described in the embodiments, or equivalent replacements can be made to some or all technical features in the technical solutions, as long as such modifications or replacements do not cause the essence of corresponding technical solutions to depart from the scope of the present disclosure.

What is claimed is:

1. A session processing method of machine type communication, comprising:
    receiving, by a first network device, a session request message, wherein the session request message includes a device parameter, and the device parameter includes indication information used to indicate that a user equipment (UE) belongs to a machine type communication UE category;
    acquiring, by the first network device, subscription information according to the device parameter, wherein the subscription information comprises service information corresponding to the machine type communication UE category; and
    generating, by the first network device, a policy and charging control rule (PCC rule) of a subscriber of the UE according to the subscription information, and sending a session response message including the PCC rule, wherein the PCC rule includes the service information corresponding to the machine type communication UE category;
    wherein the device parameter is the information element;
    wherein the information element in the session request message is generated by a mobility management entity according to a reserved bitmap of a request type carried in an attach request message sent by the UE, and is sent to the first network device through a serving gateway and a second network device; and
    wherein the reserved bitmap of the request type carried in the attach request message indicates that the UE belongs to the machine type communication UE category.

2. The session processing method of machine type communication according to claim 1,
    wherein the acquiring, by the first network device, the subscription information according to the device parameter includes:
        sending, by the first network device, a subscription information request message to a subscription profile repository (SPR) device, wherein the subscription information request message includes the device parameter, and
        receiving subscription information of the UE that is returned by the SPR device, wherein the subscription information of the UE is acquired by the SPR device according to the device parameter in the subscription information request message;
    wherein the session request message further includes an international mobile subscriber identity used to indicate the subscriber of the UE; and
    wherein the generating, by the first network device, the PCC rule of the subscriber of the UE according to the subscription information includes:
        generating, by the first network device, the PCC rule of the UE according to the received subscription information of the UE, and
        applying the PCC rule of the UE in the subscriber of the UE according to the international mobile subscriber identity.

3. The session processing method of machine type communication according to claim 1,
    wherein the acquiring, by the first network device, the subscription information according to the device parameter includes:
        sending, by the first network device, a subscription information request message to a subscription profile repository (SPR) device, wherein the subscription information request message includes an international mobile subscriber identity used to indicate the subscriber of the UE and includes the device parameter, and
        receiving subscription information of the subscriber of the UE that is returned by the SPR device, wherein the SPR device returns the subscription information of the subscriber of the UE based on acquiring subscription information of a category to which the UE belongs according to the device parameter in the subscription information request message, acquiring subscription information of the subscriber of the UE according to the international mobile subscriber identity in the subscription information request message, replacing service information in the subscription information of the subscriber of the UE with service information in the subscription information of the category of the UE, and returning the replaced subscription information of the subscriber of the UE to the first network device; and
    wherein the generating, by the first network device, the PCC rule of the subscriber of the UE according to the subscription information includes:
        generating, by the first network device, the PCC rule of the subscriber of the UE according to the received replaced subscription information of the subscriber of the UE.

4. The session processing method of machine type communication according to claim 1, wherein the session request message is generated as triggered by an attach request message or a packet switched network connection establishment request message sent by the UE to a mobility management entity.

5. A network device, comprising:
    a receiving unit, configured to receive a session request message, wherein the session request message includes a device parameter, and the device parameter includes indication information used to indicate that a user equipment (UE) belongs to a machine type communication UE category;

an acquisition unit, configured to acquire subscription information according to the device parameter, wherein the subscription information comprises service information corresponding to the machine type communication UE category; and a response unit, configured to generate a policy and charging control rule (PCC rule) of a subscriber of the UE according to the subscription information, carry the PCC rule in a session response message, and send the session response message, wherein the PCC rule includes service information corresponding to the machine type communication UE category;

wherein the device parameter is the information element;

wherein the information element in the session request message is generated by a mobility management entity according to a reserved bitmap of a request type carried in an attach request message sent by the UE, and is sent to the network device; and wherein the reserved bitmap of the request type carried in the attach request message indicates that the UE belongs to the machine type communication UE category.

6. The network device according to claim 5, wherein the acquisition unit is further configured to send, to a subscription profile repository (SPR) device, a subscription information request message carrying the device parameter, and receive subscription information of the UE that is returned by the SPR device and acquired according to the device parameter in the subscription information request message;

the session request message further includes an international mobile subscriber identity used to indicate the subscriber of the UE; and the response unit is further configured to generate the PCC rule of the UE according to the received subscription information of the UE, and apply the PCC rule of the UE in the subscriber of the UE according to the international mobile subscriber identity.

7. The network device according to claim 5, wherein the acquisition unit is further configured to send, to a subscription profile repository (SPR) device, a subscription information request message that includes an international mobile subscriber identity used to indicate the subscriber of the UE and includes the device parameter, and receive subscription information of the subscriber of the UE that is returned by the SPR device, wherein the SPR device returns the subscription information of the subscriber of the UE based on acquiring subscription information of a category to which the UE belongs according to the device parameter in the subscription information request message, acquiring subscription information of the subscriber of the UE according to the international mobile subscriber identity in the subscription information request message, replacing service information in the subscription information of the subscriber of the UE with service information in the subscription information of the category of the UE, and sending the replaced subscription information of the subscriber of the UE to the response unit; and the response unit is further configured to generate the PCC rule of the subscriber of the UE according to the received replaced subscription information of the subscriber of the UE.

* * * * *